United States Patent
Park et al.

(10) Patent No.: US 9,948,924 B2
(45) Date of Patent: Apr. 17, 2018

(54) IMAGE GENERATING APPARATUS AND DISPLAY DEVICE FOR LAYERED DISPLAY SCHEME BASED ON LOCATION OF EYE OF USER

(71) Applicant: Samsung Electronics Co., Ltd., Suwon-si (KR)

(72) Inventors: Ju Yong Park, Seongnam-si (KR); Dong Kyung Nam, Yongin-si (KR); Seok Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 100 days.

(21) Appl. No.: 14/487,550

(22) Filed: Sep. 16, 2014

(65) Prior Publication Data

US 2015/0091897 A1 Apr. 2, 2015

(30) Foreign Application Priority Data

Sep. 30, 2013 (KR) .................. 10-2013-0116425
Nov. 4, 2013 (KR) .................. 10-2013-0132712

(51) Int. Cl.
*G06T 19/00* (2011.01)
*G02B 27/22* (2006.01)
*H04N 13/04* (2006.01)
*G02B 27/26* (2006.01)
*H04N 13/00* (2018.01)

(52) U.S. Cl.
CPC ......... *H04N 13/0484* (2013.01); *G02B 27/26* (2013.01); *H04N 13/0018* (2013.01); *H04N 13/0404* (2013.01); *H04N 13/0468* (2013.01); *H04N 13/0495* (2013.01)

(58) Field of Classification Search
CPC .............................. G06T 19/00; G02B 27/2214
USPC ........................................... 345/419; 359/462
See application file for complete search history.

(56) References Cited

U.S. PATENT DOCUMENTS

| | | | |
|---|---|---|---|
| 2004/0246199 A1 | 12/2004 | Ramian | |
| 2005/0146787 A1* | 7/2005 | Lukyanitsa | G02B 27/2214 359/462 |
| 2010/0073768 A1* | 3/2010 | Kim | G02B 27/2214 359/463 |

(Continued)

FOREIGN PATENT DOCUMENTS

| | | |
|---|---|---|
| CN | 101061415 A | 10/2007 |
| CN | 101557536 A | 10/2009 |

(Continued)

OTHER PUBLICATIONS

Munekazu Date, "Luminance addition of a stack of multidomain liquid-crystal displays and capability for depth-fused three-dimensional display application", Applied Optics, vol. 44, No. 6, Feb. 2005, 8 pages.

(Continued)

*Primary Examiner* — Zhengxi Liu
*Assistant Examiner* — Yi Yang
(74) *Attorney, Agent, or Firm* — NSIP Law

(57) ABSTRACT

An image generating apparatus and a display device for a layered display scheme based on a location of an eye of a user are provided, wherein the image generating apparatus may generate layer images for a three-dimensional (3D) image based on information related to pixels matched based on the location of the eye of the user.

28 Claims, 15 Drawing Sheets

(56) References Cited

U.S. PATENT DOCUMENTS

| | | | | |
|---|---|---|---|---|
| 2010/0118061 A1* | 5/2010 | Suzuki | ............... | G09G 3/3648 345/690 |
| 2010/0157400 A1* | 6/2010 | Dimov | ................. | G02B 5/188 359/13 |
| 2010/0238366 A1 | 9/2010 | Chang et al. | | |
| 2011/0093778 A1* | 4/2011 | Kim | ....................... | G06F 3/041 715/702 |
| 2011/0295919 A1* | 12/2011 | Massenburg | ........... | H03G 3/002 708/306 |
| 2012/0002060 A1* | 1/2012 | Kusanagi | ............. | G02B 27/646 348/208.4 |
| 2012/0044330 A1 | 2/2012 | Watanabe | | |
| 2012/0154373 A1* | 6/2012 | Finocchio | .............. | G06N 5/046 345/419 |
| 2012/0154626 A1* | 6/2012 | Hatakeyama | .......... | H04N 9/646 348/223.1 |
| 2013/0010457 A1* | 1/2013 | Hayashi | ............ | G02F 1/133611 362/97.2 |
| 2013/0038598 A1 | 2/2013 | Tsai | | |

FOREIGN PATENT DOCUMENTS

| | | | |
|---|---|---|---|
| CN | 101984670 A | | 3/2011 |
| CN | 103118267 A | | 5/2013 |
| EP | 2 166 402 A2 | | 3/2010 |
| JP | 2005-010304 | | 1/2005 |
| KR | 10-2008-0057924 | | 6/2008 |
| KR | 10-2010-0038854 | | 4/2010 |
| KR | 10-2012-0109303 | | 10/2012 |
| TW | 201035966 A | | 10/2010 |
| WO | WO 2013/089249 A1 | | 6/2013 |

OTHER PUBLICATIONS

Douglas Lanman, "Content-Adaptive Parallax Barriers: Optimizing Dual-Layer 3D Displays using Low-Rank Light Field Factorization", http://cameraculture.media.mit.edu/contentadaptive, 10 pages.

Douglas Lanman, "Polarization Fields: Dynamic Light Field Display using Multi-Layer LCDs", 9 pages.

Gordon Wetzstein, "Tensor Displays: Compressive Light Field Synthesis using Multilayer Displays with Directional Backlighting", 11 pages.

Extended European Search Report dated Oct. 22, 2014, in counterpart European Application No. 14178767.1 (9 pages, in English).

Chinese Office Action dated Jun. 21, 2017 in Counterpart Chinese Application No. 20140453046.9 (21 pages in Chinese with English translation).

* cited by examiner

IMAGE GENERATING APPARATUS AND DISPLAY DEVICE FOR LAYERED DISPLAY SCHEME BASED ON LOCATION OF EYE OF USER

CROSS-REFERENCE TO RELATED APPLICATIONS

This application claims the priority benefit of Korean Patent Application No. 10-2013-0116425, filed on Sep. 30, 2013, and Korean Patent Application No. 10-2013-0132712, filed on Nov. 4, 2013, in the Korean Intellectual Property Office, the disclosures of which are incorporated herein by reference.

BACKGROUND

1. Field

Example embodiments of the following description relate to a scheme of generating an image to display a three-dimensional (3D) image and a 3D image display device.

2. Description of the Related Art

Among factors related to three-dimensional (3D) image recognition, the foremost factor is a disparity between images viewed by both eyes of a user. Methods of providing different images to both eyes of a user may be classified into a stereoscopic type and an autostereoscopic type. The stereoscopic type method may filter a desired image through division using a polarized light, time division, and a wavelength division for differentiating a wavelength of a primary color. The autostereoscopic type method may enable images to be viewed in a predetermined space only using a parallax barrier or a lenticular lens.

The autostereoscopic type method may alleviate an inconvenience of wearing glasses. However, in the autostereoscopic type method, a great number of views may be used to broaden a viewing area, an image quality may deteriorate due to a crosstalk between views, and the image quality may also deteriorate remarkably at a location outside of a determined optimal viewing distance.

SUMMARY

One solution that may supplement the decrease in the resolution occurring in proportion to the number of directions of light desired to be expressed may be a layered display. The layered display may express different information based on a viewing location using at least two display panels. The layered display may display an image with a small depth at a maximum level of a resolution of an upper panel. The layered display may refer to a system that may include at least two layers of panels, without a lens or a barrier, and express different signals in different directions. However, as a number of images desired to be displayed increases, a computational complexity for generating images may increase.

The following description may implement a 3D image by tracking a location of an eye and displaying a desired image at a limited number of locations while maintaining an advantage of a layered display in displaying an image, and restricting an increase in a computational complexity with respect to expression of a number of views or directions. The following description may simultaneously resolve a degradation in a resolution in a conventional method and an increase in a computational complexity in a new method.

The following description relates to a layered display advantageous to resolution expression, among autostereoscopic three-dimensional (3D) displays. The layered display may display a desired image at a desired location using eye tracking, thereby reducing an operational complexity such that the layered display may be utilized more efficiently. To display an image of unlimited various directions, the operational complexity may increase. When it is impossible to express information of various directions, a method of minimizing a difference between information desired to be expressed and information to be expressed may be employed. In this example, a probability of the difference may increase and thus, a quality of image may decrease. Herein, by extremely restraining a location at which the image is desired to be displayed to a location of an eye, the operational complexity may be reduced and a value desired to be expressed and a value to be observed may be reduced, whereby a high-quality image may be displayed. In addition, by selecting an image desired to be display which is suitable for the location of the eye, a realistic experience similar to an actual object existing in a predetermined location in a 3D space may be provided to a viewer. Because a number of locations in the space desired to be express may be adjusted based on a number of viewers, an image may be displayed accordingly when locations of eyes of the plurality of viewers are obtained.

The foregoing and/or other aspects are achieved by providing an image generating apparatus including a receiver to receive a location of an eye of a user, a matching unit to match a plurality of pixels included in a plurality of layers based on the location of the eye, and a generator to generate a plurality of layer images for the plurality of layers based on information related to the matched pixels. The plurality of layers may be configured to display a three-dimensional (3D) image.

The matching unit may generate matching information by selecting at least one pixel from each of the plurality of layers based on the location of the eye. The matching unit may match pixels positioned on a path along which light emitted from a light emitter reaches the eye of the user.

The information related to the matched pixels may include first matching information and second matching information. The matching unit may generate the first matching information based on a location of a left eye of the user, and generate the second matching information based on a location of a right eye of the user.

The apparatus may further include an image receiver to receive a first image corresponding to a location of a left eye of the user and a second image corresponding to a location of a right eye of the user. The generator may generate the plurality of layer images based on the first image, the second image, and the information related to the matched pixels. The apparatus may further include an image determiner to determine the first image and the second image based on the location of the eye.

The matching unit may match pixels positioned on a path along which light emitted from a light emitter passes through a center of a pixel included in one of the plurality of layers and reach the eye of the user. The matching unit may match pixels positioned on a path along which light emitted from a light emitter passes through an internal area between boundaries of a pixel included in one of the plurality of layers and reach the eye of the user. The matching unit may match pixels positioned on a path along which light emitted from a light emitter passes through a lens disposed between the plurality of layers and reach the eye of the user. The lens may be disposed at a location separated by a focal distance of the lens from a layer closer to the light emitter, between two layers adjacent to the lens.

The generator may generate the plurality of layer images for a difference between an image desired to be displayed at the location of the eye and an image to be displayed at the location of the eye based on the information related to the matched pixels and the plurality of layer images to be minimized.

The generator may generate the plurality of layer images based on a type of a layered display comprising the plurality of layers. The type of the layered display may include a first type to control a transmittance of a layer, and a second type to control a degree of polarization rotation of a layer.

The location of the eye of the user may include locations of a plurality of eyes with respect to a plurality of users. The matching unit may match the plurality of pixels based on the locations of the plurality of eyes. The generator may generate layer images to provide a 3D image to each of the plurality of users.

The matching unit may generate matching information by selecting a subpixel of an identical type in each of the plurality of layers based on the location of the eye.

The foregoing and/or other aspects are achieved by providing a display device including a plurality of panels configured to display a 3D image, an obtainer to obtain matching information corresponding to a target location, the matching information comprising information related to matched pixels belonging to different panels, and a controller to control, based on the matching information, the plurality of panels for the 3D image to be displayed at the target location. The matching information may include information related to matched pixels positioned on a path along which light emitted from a light emitter reaches the target location.

The device may further include a sensor to sense the target location. The sensor may include at least one of a first sensor using a plurality of vision sensors and a second sensor using a vision sensor and a depth sensor.

The plurality of panels may include at least one of a first panel to attenuate a luminance of light on a layer corresponding to the panel and a second panel to rotate a polarization direction of light on a layer corresponding to the panel.

The controller may determine a plurality of layer images corresponding to the plurality of panels for a difference between an image desired to be displayed at the target location and an image to be displayed at the target location based on the matching information and the plurality of panels to be minimized.

The device may further include a lens disposed between the plurality of panels. The lens may be disposed at a location separated by a focal distance of the lens from a panel closer to the light emitter, between two panels adjacent to the lens. The lens may restrict a direction of light to a predetermined area.

The foregoing and/or other aspects are achieved by providing an image generating method including obtaining information on a location of an eye of a user, obtaining matching information between pixels belonging to different layers based on the information on the location of the eye, acquiring an image desired to be displayed based on the information on the location of the eye, and generating a plurality of layer images corresponding to a plurality of layers based on the matching information and the acquired image.

The method may further include applying each of the plurality of layer images to a corresponding layer.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
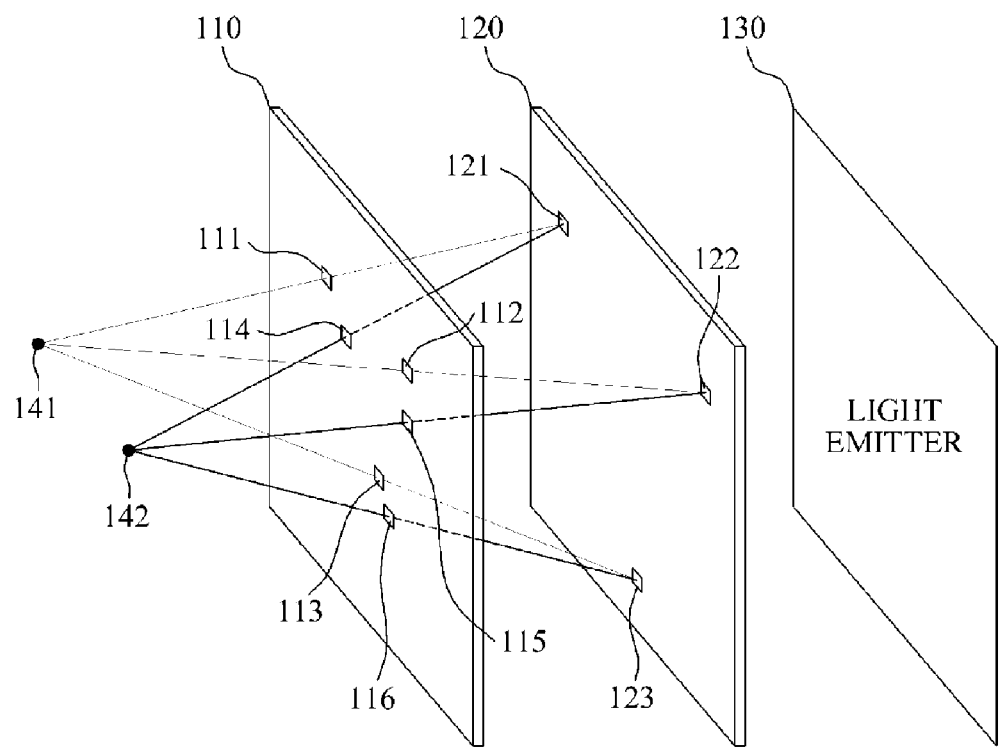
FIG. 1 illustrates a display device for displaying a three-dimensional (3D) image at a location of an eye of a user according to example embodiments.

Reference will now be made in detail to embodiments, examples of which are illustrated in the accompanying drawings, wherein like reference numerals refer to like elements throughout. Example embodiments are described below to explain the present disclosure by referring to the figures.

FIG. 1 illustrates a display device for displaying a three-dimensional (3D) image at a location of an eye of a user according to example embodiments.

Referring to FIG. 1, the display device may include a plurality of layers 110 and 120. The display device may display a 3D image by differentiating light to be recognized by a left eye 141 from light to be recognized by a right eye 142 of a user, using the plurality of layers 110 and 120. Hereinafter, a method of displaying a 3D image using the plurality of layers 110 and 120 in the display device will be described in detail.

The locations of the left eye 141 and the right eye 142 of the user may be tracked. To display a 3D image using a binocular disparity, different images should be reproduced at the left eye 141 and the right eye 142. The display device may reproduce different images at the left eye 141 and the right eye 142 using a layered display. For example, to display different images at the left eye 141 and the right eye 142, a first image to be displayed on the first layer 120 and a second image to be displayed on the second layer 110 may be generated.

In a case of a plurality of users, locations of eyes of the plurality of users may be tracked. In this example, the display device may generate the first image to be displayed on the first layer 120 and the second image to be displayed on the second layer 110 so that desired different images may be reproduced at a left eye of a first user, a right eye of the first user, a left eye of a second user, and a right eye of the second user, respectively.

The display device does not reproduce images at locations other than the tracked locations of the eyes of the user when generating the first image to be displayed on the first layer 120 and the second image to be displayed on the second layer 110. In other words, the display device only reproduces images corresponding to tracked locations of the eyes of the user. Thus, the computational complexity may be reduced. Furthermore, the disclosure is not limited to a case of using two layers. When at least three layers are used, a more accurate 3D image may be displayed.

Each of the plurality of layers 110 and 120 may include various types of display panels. For example, the plurality of layers 110 and 120 may include display panels configured to control a transmittance of passing light. The display panels may control the transmittance of the passing light, thereby expressing colors. Light emitted by a light emitter 130 may correspond to white light having red (R), green (G), and blue (B) attributes. The display panels may control a transmittance of the R attribute, a transmittance of the G attribute, and a transmittance of the B attributes, separately. The display panels may include a plurality of pixels, and control a transmittance of an R attribute, a transmittance of a G attribute, and a transmittance of a B attribute of light passing through each pixel. Each of the plurality of pixels may include an R subpixel configured to control the transmittance of the R attribute, a G subpixel configured to control the transmittance of the G attribute, and a B subpixel configured to control the transmittance of the B attribute. Each of the plurality of pixels may express white light using a combination of the transmittance of the R attribute, the transmittance of the G attribute, and the transmittance of the B attribute. However, each of the plurality of pixels may further include a separate W subpixel configured to control a transmittance of a white (W) attribute.

Because the left eye 141 and the right eye 142 are spatially separated, light emitted by the light emitter 130 may reach the left eye 141 and the right eye 142 along different paths. For example, light passing through a pixel 121 included in the first layer 120 may pass through a pixel 111 included in the second layer 110 and reach the left eye 141. Light passing through the pixel 121 included in the first layer 120 may pass through a pixel 114 included in the second layer 110 and reach the right eye 142. In this example, the light recognized at a location of the left eye 141 may be determined based on a combination of a transmittance of the pixel 121 included in the first layer 120 and a transmittance of the pixel 111 included in the second layer 110. The light recognized at a location of the right eye 142 may be determined based on a combination of the transmittance of the pixel 121 included in the first layer 120 and a transmittance of the pixel 114 included in the second layer 110.

The display device may control the pixel 121 included in the first layer 120, the pixel 111 included in the second layer 110, and the pixel 114 included in the second layer 110 to differentiate an image to be displayed at the location of the left eye 141 from an image to be displayed at the location of the right eye 142. For example, the display device may control a transmittance of an R attribute to be 0.9, a transmittance of a G attribute to be 0.6, and a transmittance of a B attribute to be 0.5 with respect to the pixel 121 included in the first layer 120. The display device may control a transmittance of an R attribute to be 0.1, a transmittance of a G attribute to be 0.5, and a transmittance of a B attribute to be 0.8 with respect to the pixel 111 included in the second layer 110. The display device may control a transmittance of an R attribute to be 0.9, a transmittance of a G attribute to be 0.1, and a transmittance of a B attribute to be 0.5 with respect to the pixel 114 included in the second layer 110.

In this example, a color of the light reaching the location of the left eye 141 may be determined based on a combination of the transmittances of the R attributes, a combination of the transmittances of the G attributes, and a combination of the transmittances of the B attributes with respect to the pixels 121 and 111 positioned on a path. A combination of transmittances may be calculated based on a product of the transmittances. For example, the R attribute of the light reaching the location of the left eye 141 may be expressed as 0.09 corresponding to a product of the transmittance 0.9 of the R attribute of the pixel 121 and the transmittance 0.1 of the R attribute of the pixel 111. The G attribute of the light reaching the location of the left eye 141 may be expressed as 0.30 corresponding to a product of the transmittance 0.6 of the G attribute of the pixel 121 and the transmittance 0.5 of the G attribute of the pixel 111. The B attribute of the light reaching the location of the left eye 141 may be expressed as 0.40 corresponding to a product of the transmittance 0.5 of the B attribute of the pixel 121 and the transmittance 0.8 of the B attribute of the pixel 111.

Similarly, because the light reaching the location of the right eye 142 may pass through the pixel 121 included in the first layer 120 and the pixel 114 included in the second layer 110, a color of the light reaching the location of the right eye 142 may be determined based on a combination of the transmittances of the R attributes, a combination of the transmittances of the G attributes, and a combination of the transmittances of the B attributes with respect to the pixels 121 and 114 positioned on a path. A combination of transmittances may be calculated based on a product of the transmittances. For example, the R attribute of the light reaching the location of the right eye 142 may be expressed as 0.81 corresponding to a product of the transmittance 0.9 of the R attribute of the pixel 121 and the transmittance 0.9 of the R attribute of the pixel 114. The G attribute of the light reaching the location of the right eye 142 may be expressed as 0.06 corresponding to a product of the transmittance 0.6 of the G attribute of the pixel 121 and the transmittance 0.1 of the G attribute of the pixel 114. The B attribute of the light reaching the location of the right eye 142 may be expressed as 0.25 corresponding to a product of the transmittance 0.5 of the B attribute of the pixel 121 and the transmittance 0.5 of the B attribute of the pixel 114.

Light having transmittances (0.09, 0.30, 0.40) of RGB attributes may reach the location of the left eye 141, and light having transmittances (0.81, 0.06, 0.25) of RGB attributes may reach the location of the right eye 142. Thus, the display device may provide a 3D image to a user using a difference between images reaching both eyes of the user.

In example embodiments, the plurality of layers 110 and 120 may include display panels configured to control a degree of polarization rotation of light passing through the plurality of layers 110 and 120. The display panels may control the degree of polarization rotation of light passing through the plurality of layers 110 and 120, thereby expressing colors. The display panels may control a degree of polarization rotation of an R attribute, a degree of polarization rotation of a G attribute, and a degree of polarization rotation of a B attribute, separately. The display panels may include a plurality of pixels, and control a degree of polarization rotation of an R attribute, a degree of polarization rotation of a G attribute, and a degree of polarization rotation of a B attribute of light passing through each pixel. Each of the plurality of pixels may include an R subpixel configured to control the degree of polarization rotation of the R attribute, a G subpixel configured to control the degree of polarization rotation of the G attribute, and a B subpixel configured to control the degree of polarization rotation of the B attribute. Each of the plurality of pixels may express white light through a combination of the degree of polarization rotation of the R attribute, the degree of polarization rotation of the G attribute, and the degree of polarization rotation of the B attribute. However, each of the plurality of pixels may further include a separate W subpixel configured to control a degree of polarization rotation of a W attribute.

The display device may control the pixel 121 included in the first layer 120, the pixel 111 included in the second layer 110, and the pixel 114 included in the second layer 110 to differentiate an image to be displayed at the location of the left eye 141 from an image to be displayed at the location of the right eye 142. For example, the display device may control a degree of polarization rotation of an R attribute to be 80°, a degree of polarization rotation of a G attribute to be 45°, and a degree of polarization rotation of a B attribute to be 30° with respect to the pixel 121 included in the first layer 120. The display device may control a degree of polarization rotation of an R attribute to be 5°, a degree of polarization rotation of a G attribute to be 15°, and a degree of polarization rotation of a B attribute to be 30° with respect to the pixel 111 included in the second layer 110. The display device may control a degree of polarization rotation of an R attribute to be 10°, a degree of polarization rotation of a G attribute to be 5°, and a degree of polarization rotation of a B attribute to be 50° with respect to the pixel 114 included in the second layer 110.

In this example, a color of the light reaching the location of the left eye 141 may be determined based on a combination of the degrees of polarization rotation of the R attributes, a combination of the degrees of polarization rotation of the G attributes, and a combination of the degrees of polarization rotation of the B attributes with respect to the pixels 121 and 111 positioned on a path. A combination of degrees of polarization rotation may be calculated based on a sum of the degrees of polarization rotation. For example, the R attribute of the light reaching the location of the left eye 141 may be expressed as 85° corresponding to a sum of the degree of polarization rotation 80° of the R attribute of the pixel 121 and the degree of polarization rotation 5° of the R attribute of the pixel 111. The G attribute of the light reaching the location of the left eye 141 may be expressed as 60° corresponding to a sum of the degree of polarization rotation 45° of the G attribute of the pixel 121 and the degree of polarization rotation 15° of the G attribute of the pixel 111. The B attribute of the light reaching the location of the left eye 141 may be expressed as 60° corresponding to a sum of the degree of polarization rotation 30° of the B attribute of the pixel 121 and the degree of polarization rotation 30° of the B attribute of the pixel 111.

Similarly, because the light reaching the location of the right eye 142 may pass through the pixel 121 included in the first layer 120 and the pixel 114 included in the second layer 110, a color of the light reaching the location of the right eye 142 may be determined based on a combination of the degrees of polarization rotation of the R attributes, a combination of the degrees of polarization rotation of the G attributes, and a combination of the degrees of polarization rotation of the B attributes with respect to the pixels 121 and 114 positioned on a path. A combination of degrees of polarization rotation may be calculated based on a sum of the degrees of polarization rotation. For example, the R attribute of the light reaching the location of the right eye 142 may be expressed as 90° corresponding to a sum of the degree of polarization rotation 80° of the R attribute of the pixel 121 and the degree of polarization rotation 10° of the R attribute of the pixel 114. The G attribute of the light reaching the location of the right eye 142 may be expressed as 50° corresponding to a sum of the degree of polarization rotation 45° of the G attribute of the pixel 121 and the degree of polarization rotation 5° of the G attribute of the pixel 114. The B attribute of the light reaching the location of the right eye 142 may be expressed as 80° corresponding to a sum of the degree of polarization rotation 30° of the B attribute of the pixel 121 and the degree of polarization rotation 50° of the B attribute of the pixel 114.

Light having degrees of polarization rotation (85°, 60°, 60°) of RGB attributes may reach the location of the left eye 141, and light having degrees of polarization rotation (90°, 50°, 80°) of RGB attributes may reach the location of the right eye 142. Thus, the display device may provide a 3D image to a user using a difference between images reaching both eyes of the user.

The display device may control images to be displayed on the plurality of layers 110 and 120, thereby displaying a 3D image. Hereinafter, the images displayed on the plurality of layers 110 and 120 may be referred to as layer images. A first layer image with respect to the first layer 120 may include information to control each of a plurality of pixels 121, 122, and 123 included in the first layer 120. For example, the first layer image may include information to control a transmittance and/or a degree of polarization rotation of each of the plurality of pixels 121, 122, and 123 included in the first layer 120. In addition, a second layer image with respect to the second layer 110 may include information to control each of a plurality of pixels 111, 112, 113, 114, 115, and 116 included in the second layer 110. For example, the second layer image may include information to control a transmittance and/or a degree of polarization rotation of each of the plurality of pixels 111, 112, 113, 114, 115, and 116 included in the second layer 110.

The display device may provide technology that enables different images to be observed depending on locations of both eyes of a user, using a plurality of display panels. Thus, the display device may prevent a resolution from decreasing in proportion to a number of directions of beams of light to be expressed. The display device may display an image of a maximum panel resolution level based on a depth of the image.

Although not shown in the drawings, the display device may provide a 3D image to a user using at least three layers. The display device may generate layer images to control the at least three layers.

The display device may reduce a complexity of operation performed to generate a layer image based on information on a location of an eye of a user. The display device may receive information on the location of the eye of the user from a sensor configured to track the location of the eye of the user, and generate the layer image based on the received information. In this example, a size of a service area to provide a 3D image may decrease to a size of an area estimated as the location of the eye of the user. The display device may display the 3D image in the area estimated as the location of the eye of the user and thus, the complexity of operation performed to generate layer images may decrease. The display device may provide technology that requires a low operational complexity while providing a high-resolution 3D image.

The display device may provide a 3D image to a plurality of users based on information on locations of eyes of the plurality of users. In a case in which the 3D image is provided to the plurality of users, a size of a service area to provide the 3D image may still decrease to a size of an area estimated as a location of an eye of each user. Thus, a complexity of operation performed to generate layer images may decrease. A method of generating a plurality of layer images based on information on a location of an eye of a user will be described in detail with reference to FIGS. 2A through 11B.

Figure 2A:
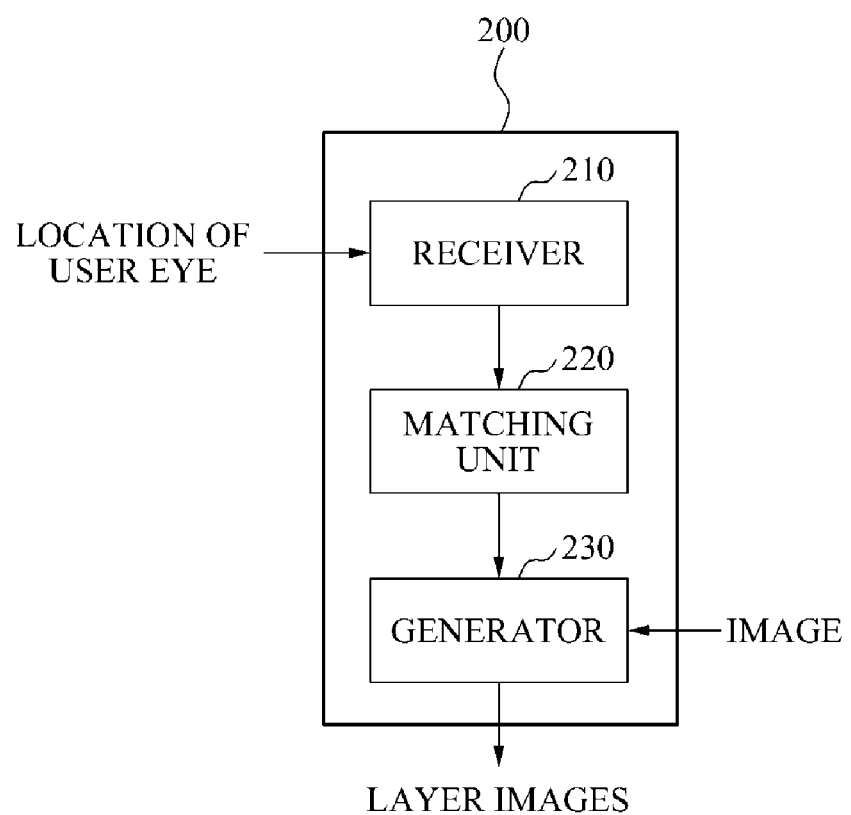
FIGS. 2A and 2B illustrate an image generating apparatus according to example embodiments.
Figure 2B:
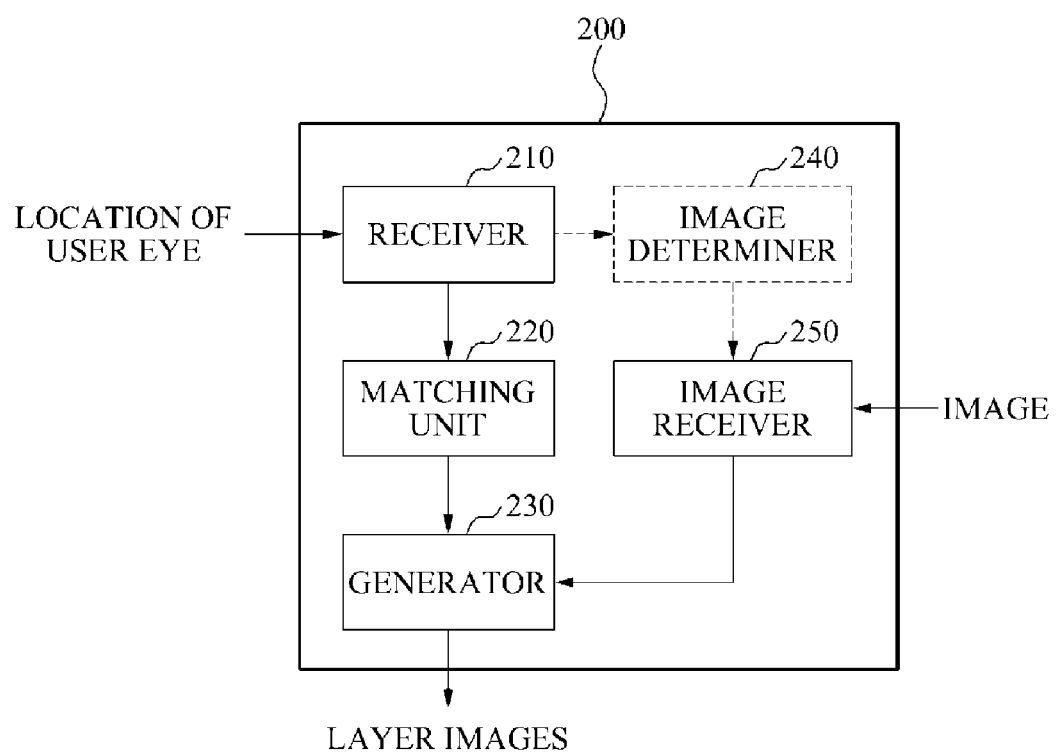

FIGS. 2A and 2B illustrate an image generating apparatus 200 according to example embodiments.

Referring to FIG. 2A, the image generating apparatus 200 may include a receiver 210, a matching unit 220, and a generator 230. The receiver 210 may receive a position of an eye of a user. The location of the eye of the user may be expressed using coordinates in a 3D space, and include locations of both eyes of the user. The receiver 210 may receive locations of eyes of a plurality of users.

The receiver 210 may receive the location of the eye of the user from a sensor (not shown) configured to track the location of the eye of the user. The receiver 210 may be connected to the sensor in a wired or wireless manner. The sensor configured to track a location of an eye of a user may be implemented using various schemes. For example, the sensor may track the location of the eye of the user using a plurality of vision sensors. The sensor may analyze an image photographed by each of the plurality of vision sensors to track the location of the eye of the user in a 3D space. In an example, the sensor may track the location of the eye of the user using a vision sensor and a depth sensor. The sensor may track the location of the eye of the user in the 3D space by combining an image photographed by the vision sensor with an image photographed using the depth sensor. In an example, the sensor may track the location of the eye of the user using a single vision sensor and based on pre-provided information on a distance between eyes. The sensor may track the location of the eye of the user in the 3D space by combining an image photographed by the vision sensor and the pre-provided information on the distance between eyes.

The matching unit 220 may match a plurality of pixels included in a plurality of layers based on the received location of the eye. The matching unit 220 may generate matching information for each of both eyes of the user. For example, the matching unit 220 may receive the location of the left eye 141, and match the pixel 121 included in the first layer 120 to the pixel 111 included in the second layer 110 based on a path along which light emitted by the light emitter 130 reaches the left eye 141. Similarly, the matching unit 220 may match the pixel 122 included in the first layer 120 to the pixel 112 included in the second layer 110. The matching unit 220 may match the pixel 123 included in the first layer 120 to the pixel 113 included in the second layer 110. The matching unit 220 may receive the location of the right eye 142, and match the pixel 121 included in the first layer 120 to the pixel 114 included in the second layer 110 based on a path along which light emitted by the light emitter 130 reaches the right eye 142. The matching unit 220 may match the pixel 122 included in the first layer 120 to the pixel 115 included in the second layer 110, and match the pixel 123 included in the first layer 120 to the pixel 116 included in the second layer 110. The matching unit 220 may store the matching information in a form of a table, as shown in Table 1.

TABLE 1

| Left eye 141 | | Right eye 142 | |
|---|---|---|---|
| First layer 120 | Second layer 110 | First layer 120 | Second layer 110 |
| Pixel 121 | Pixel 111 | Pixel 121 | Pixel 114 |
| Pixel 122 | Pixel 112 | Pixel 122 | Pixel 115 |
| Pixel 123 | Pixel 113 | Pixel 123 | Pixel 116 |
| ... | ... | ... | ... |

The matching unit 220 may match pixels belonging to different layers using various schemes. For example, the matching unit 220 may determine one of the plurality of layers to be a reference layer. The matching unit 220 may match a plurality of pixels included in the reference layer to pixels included in another layer, respectively. The matching unit 220 may determine an uppermost layer closest to the location of the eye of the user to be the reference layer, or determine a lowermost layer closest to a light emitter to be the reference layer. In an example, the matching unit 220 may match subpixels included in each pixel. In this example, the matching unit 220 may match subpixels of the same type. A scheme of matching pixels belonging to different layers through the matching unit 220 will be described in detail with reference to FIGS. 3 to 9.

The generator 230 may generate a plurality of layer images based on the matching information. The generator 230 may receive an image desired to be displayed at the location of the eye of the user. The image desired to be displayed at the location of the eye of the user may include an image desired to be displayed at the left eye of the user and an image desired to be displayed at the right eye of the user. The generator 230 may calculate the plurality of layer images based on the matching information with respect to both eyes of the user and information on the images desired to be expressed at the locations of both eyes.

A plurality of matching tuples included in the matching information may repeatedly include identical pixels. Accordingly, there may be a difference between the image desired to be displayed at the location of the eye of the user and an image to be displayed actually at the location of the user by the plurality of layers.

Referring to Table 1, the matching information may include matching tuples {Pixel 121, Pixel 111}, {Pixel 122, Pixel 112}, {Pixel 123, Pixel 113}, {Pixel 121, Pixel 114}, {Pixel 122, Pixel 115}, and {Pixel 123, Pixel 116}. Although an image to be displayed by the matching tuple {Pixel 121, Pixel 111} may differ from an image to be displayed by the matching tuple {Pixel 121, Pixel 114}, both the image to be displayed by the matching tuple {Pixel 121, Pixel 111} and the image to be displayed by the matching tuple {Pixel 121, Pixel 114} may use the pixel 121. The matching information may further include other matching tuples including the pixel 121. In addition, pixels other than the pixel 121 may also be commonly used by a plurality of matching tuples. Accordingly, due to an intrinsic chain effect of a matching relationship, calculation of layer images to be used to display an image desired to be displayed intactly at the location of the eye of the user may be difficult.

The generator 230 may generate the plurality of layer images for the difference between the image to be displayed actually at the location of the eye by the plurality of layers and the image desired to be displayed at the location of the eye to be minimized. A relationship between the plurality of layer images and the image desired to be displayed at the location of the eye of the user may be expressed by Equation 1.

$$L_{actual} = f(X_1, \ldots, X_N, W) \quad \text{[Equation 1]}$$

In Equation 1, $L_{actual}$ denotes the image to be displayed actually at the location of the eye of the user, $X_N$ denotes a layer image with respect to an $N^{th}$ layer, and W denotes the matching information. The image to be displayed actually at the location of the eye of the user may correspond to a function related to matching information and N layer images.

The generator 230 may calculate the N layer images using Equation 2.

$$\underset{X_1,\ldots,X_N}{\operatorname{argmin}} \|L_{desired} - f(X_1, \ldots, X_N, W)\| \quad \text{[Equation 2]}$$

In Equation 2, $L_{desired}$ denotes the image desired to be displayed at the location of the eye of the user. The generator 230 may calculate a plurality of layer images $X_1, \ldots, X_N$ that minimizes a difference between the image $L_{desired}$ desired to be displayed at the location of the eye and the image $L_{actual}$ to be displayed actually at the location of the eye of the user.

The function f used in Equations 1 and 2 may be changed based on a type of a display panel constituting each layer. For example, when each layer includes an attenuation based display panel configured to control a transmittance of light, a final luminance of light passing through each layer may be calculated as expressed by Equation 3.

$$l_{actual} = x_1 \ldots x_N \quad \text{[Equation 3]}$$

In Equation 3, $l_{actual}$ denotes a luminance of a single pixel included in the image to be displayed actually at the location of the eye of the user, and $x_N$ denotes a transmittance of a pixel contributing to $l_{actual}$, among pixels included in the $N^{th}$ layer. Using Equation 3, Equation 2 may be expressed as given by Equation 4.

$$\underset{X_1,\ldots,X_N}{\operatorname{argmin}} \|L_{desired} - X_1 \otimes \ldots \otimes X_N\|_W \quad \text{[Equation 4]}$$

In Equation 4, ⊗ denotes a vector multiplication operation that is, an outer product operation, and W may be defined as valid pixel matching information. When a resolution of each layer corresponds to (WIDTH & HEIGHT), $X_N$ may correspond to a matrix having a size of (WIDTH*HEIGHT)*1, and $L_{desired}$ may correspond to a matrix having a size of (WIDTH*HEIGHT)*(WIDTH*HEIGHT). In addition, W denotes a sparse matrix having a size of (WIDTH*HEIGHT)*(WIDTH*HEIGHT) including a (2*WIDTH*HEIGHT) number of "1"s. W may correspond to a matrix in which values of elements corresponding to pixels contributing to a relevant beam correspond to "1" and values of remaining elements correspond to "0", with respect to each beam emitted toward the location of the eye of the user.

The generator 230 may calculate the plurality of layer images that minimize a difference between the image to be observed actually at the location of the eye of the user and the image desired to be displayed at the location of the eye of the user, with respect to the valid matching information, using Equation 4.

In an example, when each layer includes a polarization rotation based display panel configured to control a degree of polarization rotation of light, a final degree of polarization rotation of light passing through each layer may be calculated as expressed by Equation 5.

$$l_{\theta,actual} = x_{\theta,1} + \ldots + x_{\theta,N} \quad \text{[Equation 5]}$$

In Equation 5, $l_{\theta,actual}$ denotes a degree of polarization rotation of a single pixel included in the image to be displayed d actually at the location of the eye of the user, and $x_{\theta,N}$ denotes a degree of polarization rotation of a pixel contributing to $L_{\theta,actual}$) among pixels included in the $N^{th}$ layer. Using Equation 5, Equation 2 may be expressed as shown in Equation 6.

$$\underset{X_{\theta,1},\ldots,X_{\theta,N}}{\operatorname{argmin}} \|L_{\theta,desired} - W[X_{\theta,1} \ldots X_{\theta,N}]^T\| \quad \text{[Equation 6]}$$

In Equation 6, $L_{\theta,desired}$ denotes the image desired to be displayed at the location of the eye of the user, $X_{\theta,N}$ denotes a layer image with respect to the $N^{th}$ layer, and W may be defined as valid pixel matching information. When a resolution of each layer corresponds to (WIDTH & HEIGHT), $X_{\theta,N}$ may correspond to a matrix having a size of (WIDTH*HEIGHT)*1, and $L_{\theta,desired}$ may correspond to a sparse matrix having a size of (2*WIDTH*HEIGHT)*(N*WIDTH*HEIGHT) including a (2*WIDTH*HEIGHT) number of "1"s. W may correspond to a matrix in which values of elements corresponding to pixels contributing to a relevant beam correspond to "1" and values of remaining elements correspond to "0", with respect to each beam emitted toward the location of the eye of the user.

The generator 230 may convert a value of the image desired to be displayed to a degree of polarization rotation, and calculate the plurality of layer images that minimizes a difference between a degree of polarization rotation of the image to be displayed actually and a degree of polarization rotation of an observed image determined based on degrees of polarization rotation of pixels constituting each layer, using Equation 6.

In an example, when two polarization rotation based display panels configured to control a degree of polarization rotation of light are used, the generator 230 may calculate the function f using an experimentally obtained model. For example, when a polarizing film between the two panels is removed and a layered display is configured using the two panels, a degree of polarization rotation of light passing through two layers may be modeled as expressed by Equation 7.

$$l_{actual} = x_1 + x_2 - \frac{x_1 x_2}{c} \quad \text{[Equation 7]}$$

In Equation 7, c denotes a characteristic of a panel, and may comprehensively include, for example, a characteristic of an individual panel generated during a process or a characteristic corresponding to a type of the panel. Equation 7 may be arranged as expressed by Equation 8.

$$\left(1 - \frac{l_{actual}}{c}\right) = \left(1 - \frac{x_1}{c}\right)\left(1 - \frac{x_2}{c}\right) \quad \text{[Equation 8]}$$

The generator 230 may convert a domain of x in Equation 8 to a domain of $x_c$, thereby deriving an relational expression as expressed by Equation 9. In this example, $x_c=1-x/c$. In particular, $$\left(1 - \frac{l_{actual}}{c}\right)$$

of Equation 8 may be converted to $$l_c\left(1 - \frac{x_1}{c}\right)$$

of Equation 8 may be converted to $x_{c,1}$, and $(1-x_2/c)$ of Equation 8 may be converted to $x_{c,2}$.

$$l_c = x_{c,1} \cdot x_{c,2} \qquad \text{[Equation 9]}$$

In Equation 9, $l_c$ denotes a value of a single pixel included in the image to be displayed actually at the location of the eye of the user in the converted domain, and $x_{c,N}$ denotes a value of a pixel contributing to $l_c$, among pixels included in the $N^{th}$ layer. The generator 230 may calculate each of the layer images in the converted domain, using Equation 10.

$$\operatorname*{argmin}_{X_{c,1},\ldots,X_{c,N}} \|L_{c,desired} - X_{c,1} \otimes \ldots \otimes X_{c,N}\|_W \qquad \text{[Equation 10]}$$

In Equation 10, $X_{c,N}$ denotes a layer image with respect to the $N^{th}$ layer in the converted domain. The generator 230 may calculate the plurality of layer images by inversely converting a domain of the acquired layer image to the original domain.

In an example, the generator 230 may replace a multiplication operation included in Equation 9 with an addition operation, by converting the domain in Equation 9 using a logarithmic operation. In this example, the generator 230 may calculate a layer image in a domain in which two domain conversions are performed. The two domain conversions may include a domain conversion of $x_c=1-x/c$ and a domain conversion of $x_{log}=\log x$. The generator 230 may calculate the plurality of layer images by performing a domain inverse conversion of $x_{log}=\log x$ and a domain inverse conversion of $x_c=1-x/c$ with respect to a domain of the calculated layer image.

Referring to FIG. 2B, the image generating apparatus 200 may further include an image receiver 250. The image receiver 250 may receive an image desired to be displayed at the location of the eye of the user. The image receiver 250 may provide the received image to the generator 230. The image generating apparatus 200 may further include an image determiner 240. The image determiner 240 may determine an image to be displayed at the location of the eye of the user based on the location of the eye of the user. The image determiner 240 may determine different items of image content to be displayed at the location of the eye of the user based on the location of the eye of the user. The image determiner 240 may enable different images to be viewed based on the location of the eye of the user, thereby providing a multi-view 3D image to the user. The image receiver 250 may provide the image determined by the image determiner 240 to the generator 230.

FIGS. 3 through 6 illustrate examples of matching pixels in a layered display according to example embodiments. In FIG. 3 through 6, a layered display including two layers is illustrated for ease of description. However, example embodiments may also be applicable to a layered display including at least three layers.

Figure 3:
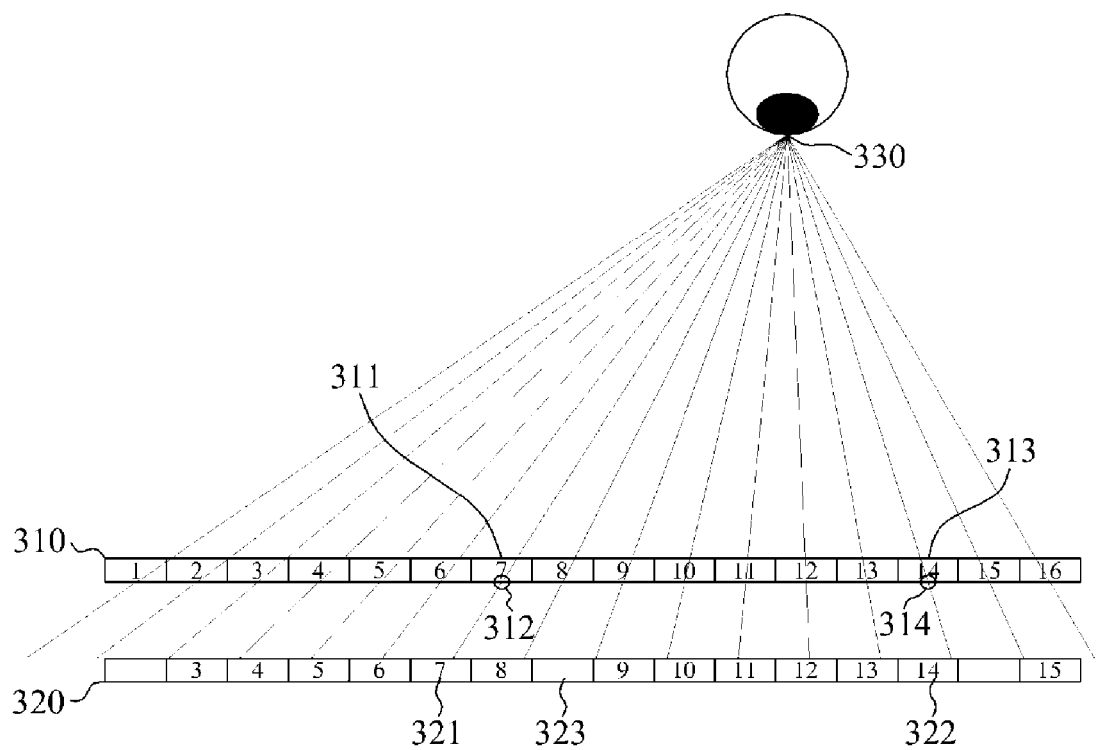
FIGS. 3 through 6 illustrate examples of matching pixels in a layered display according to example embodiments.

Referring to FIG. 3, an image generating apparatus may generate matching information using a plurality of beams of light emitted toward a location 330 of an eye of a user. Light emitted by a light emitter may pass through a layer 320 and a layer 310 and proceed toward the location 330 of the eye of the user. However, the image generating apparatus may generate the matching information by inversely tracking, from the location 330 of the eye of the user, a path along which the light proceeds.

The image generating apparatus may determine one of the plurality of layers 310 and 320 to be a reference layer. For example, the image generating apparatus may determine the layer 310 corresponding to an uppermost layer closest to the location 330 of the eye of the user to be the reference layer.

The image generating apparatus may generate the matching information using beams of light passing through centers of a plurality of pixels included in the reference layer. The image generating apparatus may generate the matching information using a path of light passing through a center 312 of a pixel 311 belonging to the layer 310 determined to be the reference layer from the location 330 of the eye of the user. In this example, the pixel 311 of the layer 310 and a pixel 321 of the layer 320 may be positioned on the corresponding path. Thus, the image generating apparatus may set the pixel 311 and the pixel 321 as a single matching pair.

The image generating apparatus may generate the matching information using a path of light passing through a center 314 of a pixel 313 belonging to the layer 310 determined to be the reference layer from the location 330 of the eye of the user. In this example, the pixel 313 of the layer 310 and a pixel 322 of the layer 320 may be positioned on the corresponding path. Thus, the image generating apparatus may set the pixel 313 and the pixel 322 as a single matching pair.

The image generating apparatus may store the matching information using a data structure corresponding to pixels of the layer 320 corresponding to a lowermost layer closest to the light emitter. The image generating apparatus may store an index of a pixel of the layer 310 matched to a pixel of the layer 320 in a data structure corresponding to the pixel of the layer 320. For example, the pixel 321 of the layer 320 may be matched to the pixel 311 of the layer 310. Thus, the image generating apparatus may store an index "7" of the pixel 311 of the layer 310 in a data structure corresponding to the pixel 321 of the layer 320. In addition, the pixel 322 of the layer 320 may be matched to the pixel 313 of the layer 310. Thus, the image generator may store an index "14" of the pixel 313 of the layer 310 in a data structure corresponding to the pixel 322 of the layer 320. When the size of the pixels included in the layer 310 is identical to the size of the pixels included in the layer 320, there may be a pixel not matched to any pixel, for example, a pixel 323.

Figure 4:
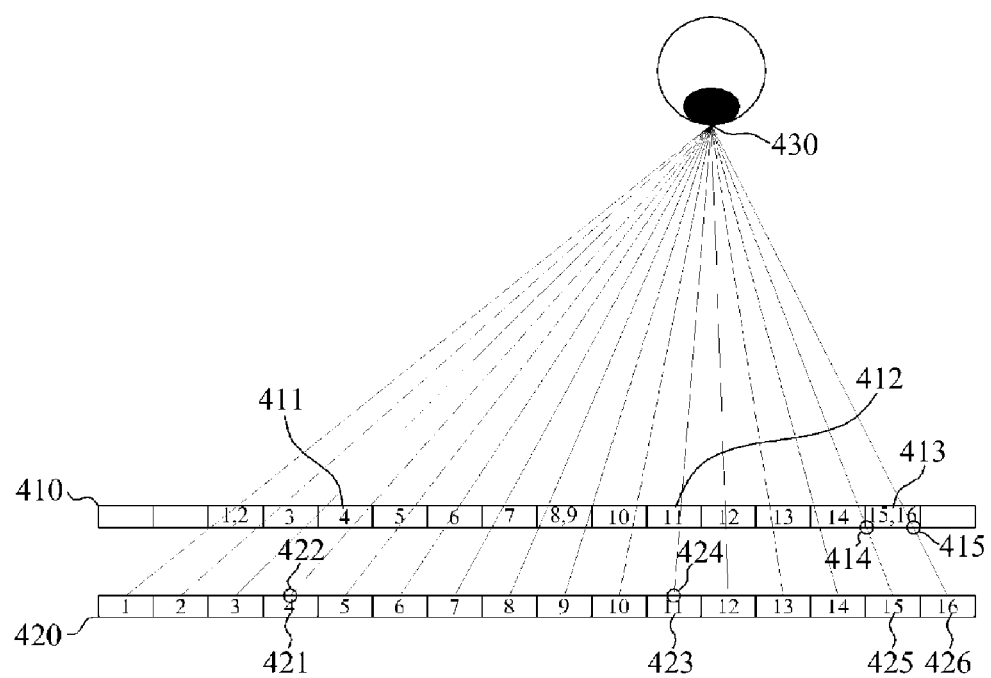

Referring to FIG. 4, the image generating apparatus may determine a layer 420 corresponding to a lowermost layer closest to the light emitter to be the reference layer. The image generating apparatus may generate the matching information using beams of light passing through centers of a plurality of pixels included in the reference layer.

The image generating apparatus may generate the matching information using a path of light passing through a center 422 of a pixel 421 belonging to the layer 420 determined to be the reference layer from a location 430 of an eye of a user.

In this example, a pixel 411 of a layer 410 and the pixel 421 of the layer 420 may be positioned on the corresponding path. Thus, the image generating apparatus may set the pixel 411 and the pixel 421 as a single matching pair.

The image generating apparatus may generate the matching information using a path of light passing through a center 424 of a pixel 423 belonging to the layer 420 determined to be the reference layer from the location 430 of the eye of the user. In this example, a pixel 412 of the layer 410 and the pixel 423 of the layer 420 may be positioned on the corresponding path. Thus, the image generating apparatus may set the pixel 412 and the pixel 423 as a single matching pair.

The image generating apparatus may store the matching information using a data structure corresponding to pixels of the layer 410 corresponding to an uppermost layer closest to the location 430 of the eye of the user. The image generating apparatus may store an index of a pixel of the layer 420 matched to a pixel of the layer 410 in a data structure corresponding to the pixel of the layer 410. For example, the pixel 411 of the layer 410 may be matched to the pixel 421 of the layer 420. Thus, the image generating apparatus may store an index "4" of the pixel 421 of the layer 420 in a data structure corresponding to the pixel 411 of the layer 410. In addition, the pixel 412 of the layer 410 may be matched to the pixel 423 of the layer 420. Thus, the image generator may store an index "11" of the pixel 423 of the layer 420 in a data structure corresponding to the pixel 412 of the layer 410.

When the size of the pixels included in the layer 410 is identical to the size of the pixels included in the layer 420, there may be a pixel matched to a plurality of pixels, for example, a pixel 413. A path of light passing through a center of a pixel 425 belonging to the layer 420 determined to be the reference layer from the location 430 of the eye of the user may pass through an internal portion 414 of a pixel 413 of the layer 410. In addition, a path of light passing through a center of a pixel 426 belonging to the layer 420 determined to be the reference layer from the location 430 of the eye of the user may pass through an internal portion 415 of the pixel 413 of the layer 410. In this example, the image generating apparatus may store an index "15" of the pixel 425 of the layer 410 and an index "16" of the pixel 426 of the layer 410 in a data structure corresponding to the pixel 413 of the layer 410.

Figure 5:
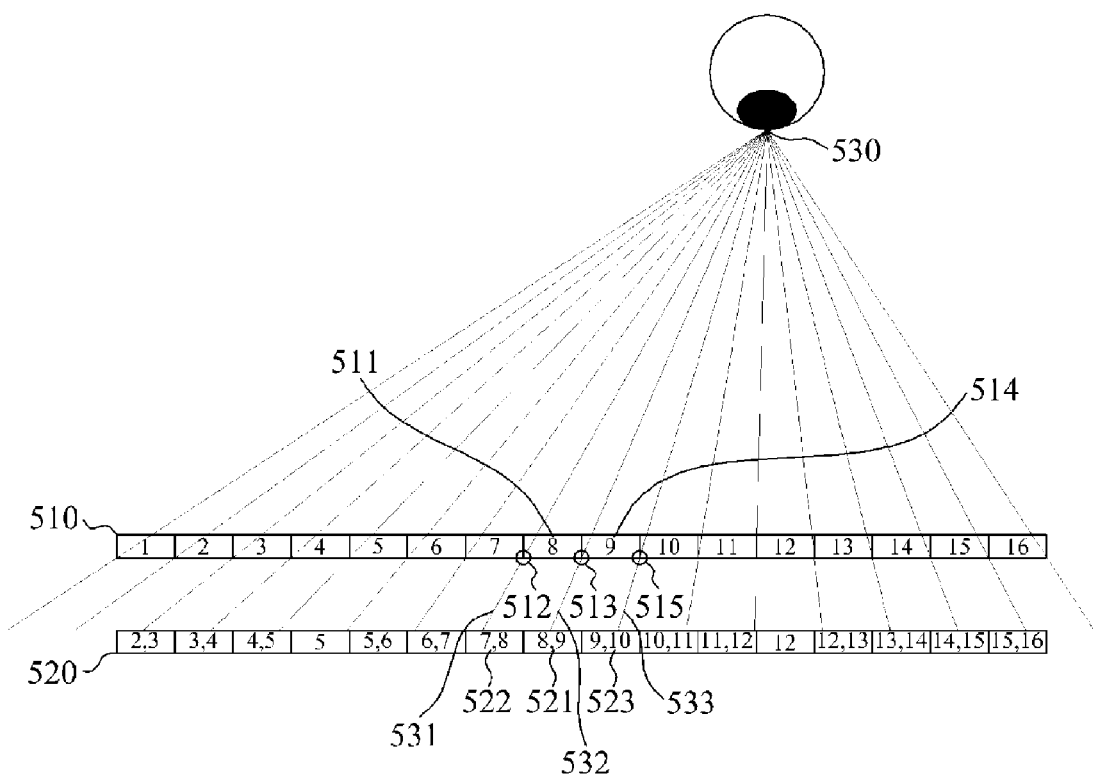

Referring to FIG. 5, the image generating apparatus may determine a layer 510 corresponding to an uppermost layer closest to a location 530 of an eye of a user to be a reference layer. The image generating apparatus may generate matching information using beams of light passing through internal areas between boundaries of a plurality of pixels included in the reference layer.

The image generating apparatus may generate the matching information using a path of light passing through an internal area between boundaries 512 and 513 of a pixel 511 belonging to the layer 510 determined to be the reference layer from the location 530 of the eye of the user. A pixel 522 and a pixel 521 of a layer 520 may be positioned in an area between a path 531 of light passing through the boundary 512 of the pixel 511 and a path 532 of light passing through the boundary 513 of the pixel 511. The image generating apparatus may set the pixel 511 and the pixel 522 as a single matching pair, and set the pixel 511 and the pixel 521 as another single matching pair.

The image generating apparatus may generate the matching information using a path of light passing through an internal area between boundaries 513 and 515 of a pixel 514 belonging to the layer 510 determined to be the reference layer from the location 530 of the eye of the user. The pixel 521 and a pixel 523 of the layer 520 may be positioned in an area between a path 532 of light passing through the boundary 513 of the pixel 514 and a path 533 of light passing through the boundary 515 of the pixel 514. The image generating apparatus may set the pixel 514 and the pixel 521 as a single matching pair, and set the pixel 514 and the pixel 523 as another single matching pair.

The image generating apparatus may store the matching information using a data structure corresponding to pixels of the layer 520 corresponding to a lowermost layer closest to the light emitter. The image generating apparatus may store an index of a pixel of the layer 510 matched to a pixel of the layer 520 in a data structure corresponding to the pixel of the layer 520. For example, the pixel 521 of the layer 520 may be matched to the pixel 511 and the pixel 514 of the layer 510. Thus, the image generating apparatus may store an index "8" of the pixel 511 of the layer 310 and an index "9" of the pixel 514 of the layer 510 in a data structure corresponding to the pixel 521 of the layer 520.

Figure 6:
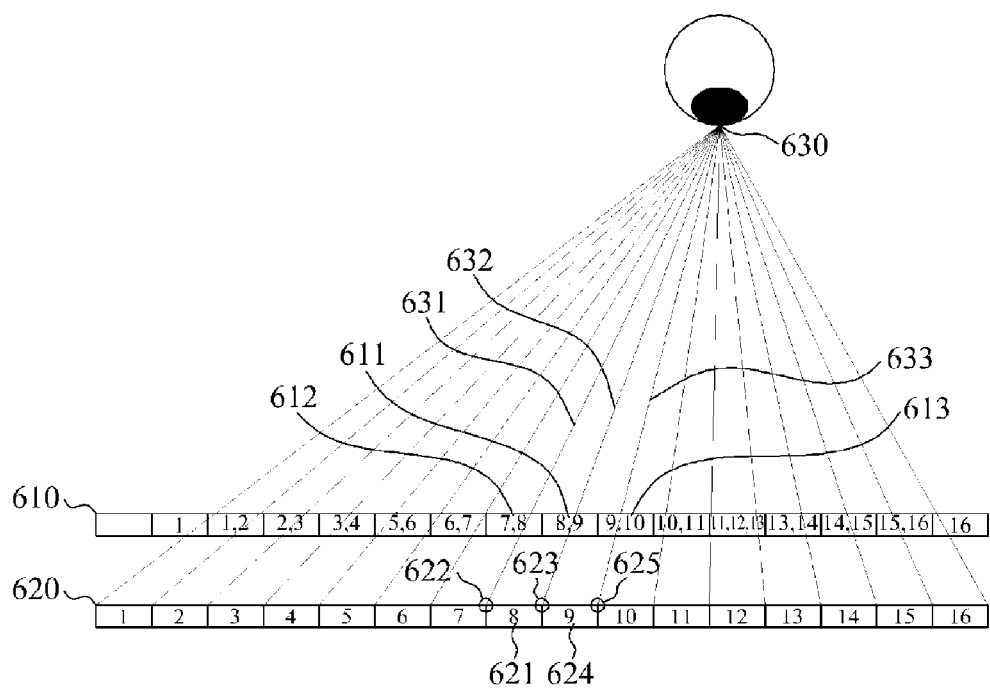

Referring to FIG. 6, the image generating apparatus may determine a layer 620 corresponding to a lowermost layer closest to the light emitter to be a reference layer. The image generating apparatus may generate matching information using beams of light passing through internal areas between boundaries of a plurality of pixels included in the reference layer.

The image generating apparatus may generate the matching information using a path of light passing through an internal area between boundaries 622 and 623 of a pixel 621 belonging to the layer 620 determined to be the reference layer, from a location 630 of an eye of a user. A pixel 612 and a pixel 611 of a layer 610 may be positioned in an area between a path 631 of light passing through the boundary 622 of the pixel 621 and a path 632 of light passing through the boundary 623 of the pixel 621. The image generating apparatus may set the pixel 612 and the pixel 621 as a single matching pair, and set the pixel 611 and the pixel 621 as another single matching pair.

The image generating apparatus may generate the matching information using a path of light passing through an internal area between boundaries 623 and 625 of a pixel 624 belonging to the layer 620 determined to be the reference layer from the location 630 of the eye of the user. The pixel 611 and a pixel 613 of a layer 610 may be positioned in an area between a path 632 of light passing through the boundary 623 of the pixel 624 and a path 633 of light passing through the boundary 625 of the pixel 624. The image generating apparatus may set the pixel 611 and the pixel 624 as a single matching pair, and set the pixel 613 and the pixel 624 as another single matching pair.

The image generating apparatus may store the matching information using a data structure corresponding to pixels of the layer 610 corresponding to an uppermost layer closest to the location 630 of the eye of the user. The image generating apparatus may store an index of a pixel of the layer 620 matched to a pixel of the layer 610 in a data structure corresponding to the pixel of the layer 610. For example, the pixel 611 of the layer 610 may be matched to the pixel 621 and the pixel 624 of the layer 620. Thus, the image generating apparatus may store an index "8" of the pixel 621 of the layer 620 and an index "9" of the pixel 624 of the layer 620 in a data structure corresponding to the pixel 611 of the layer 610.

Figure 7A:
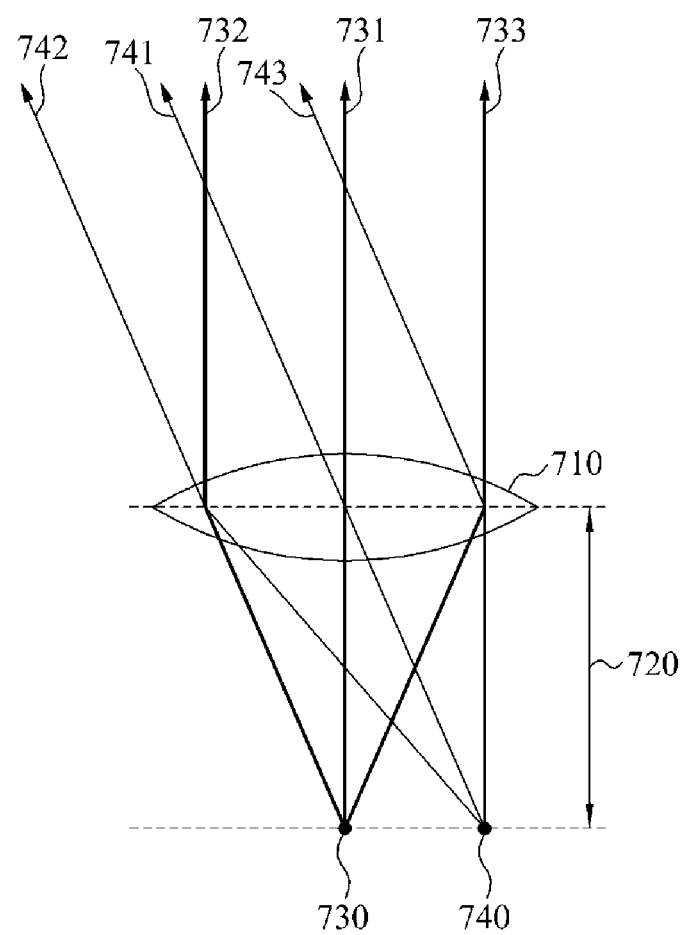
FIGS. 7A and 7B illustrate paths of light passing through a lens according to example embodiments.
Figure 7B:
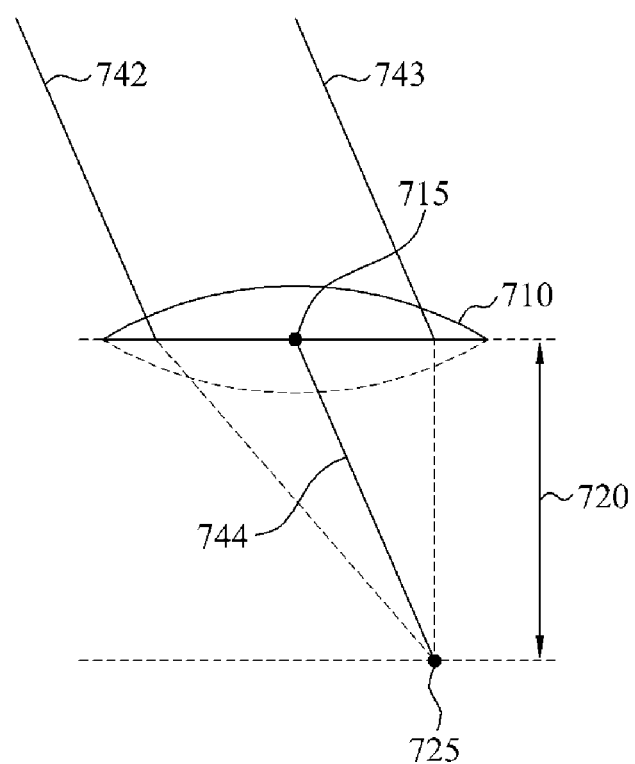

FIGS. 7A and 7B illustrate paths of light passing through a lens according to example embodiments. An image generating apparatus may use a layered display provided in a structure in which a lens is disposed between a plurality of layers.

Referring to FIG. 7A, a lens 710 may be disposed at a location separated by a focal distance 720 from a layer closer to a light emitter, between two adjacent layers. Light incident to the lens 710 from the location separated by the focal distance 720 may be refracted in a direction parallel to a straight line toward a center of the lens 710 from the corresponding location. For example, light incident to the center of the lens 710 at a location 730 separated by the focal distance 720 from the center of the lens 710 may not be refracted, and instead proceed along a path 731. Light incident to a left portion of the lens 710 at the location 730 may be refracted when passing through the lens 710 and proceed along a path 732. The path 732 may be parallel to the path 731. Light incident to a right portion of the lens 710 at the location 730 may be refracted when passing through the lens 710 and proceed along a path 733. The path 733 may be parallel to the patch 731.

As an example, light incident to the center of the lens 710 at a location 740 separated by the focal distance 720 from the right portion of the lens 710 may not be refracted, and instead proceed along a path 741. Light incident to the left portion of the lens 710 at the location 740 may be refracted when passing through the lens 710 and proceed along a path 742. The path 742 may be parallel to the path 741. Light incident to the right portion of the lens 710 at the location 740 may be refracted when passing through the lens 710 and proceed along a path 743. The path 743 may be parallel to the path 741.

Referring to FIG. 7B, light emitted by the light emitter may pass through a point 725 and the lens 710. The image generating apparatus may generate matching information by inversely tracking a path along which light passes from a location of an eye of a user. For example, when a path 742 or a path 743 corresponds to a path inversely tracked from the location of the eye of the user, the image generating apparatus may use a path 744 which is parallel to the path 742 or the path 743 and passes through a center 715 of the lens 710. The image generating apparatus may detect a point 725 separated by the focal distance 720 along the path 744 as a point positioned on the path of the light.

Figure 8:
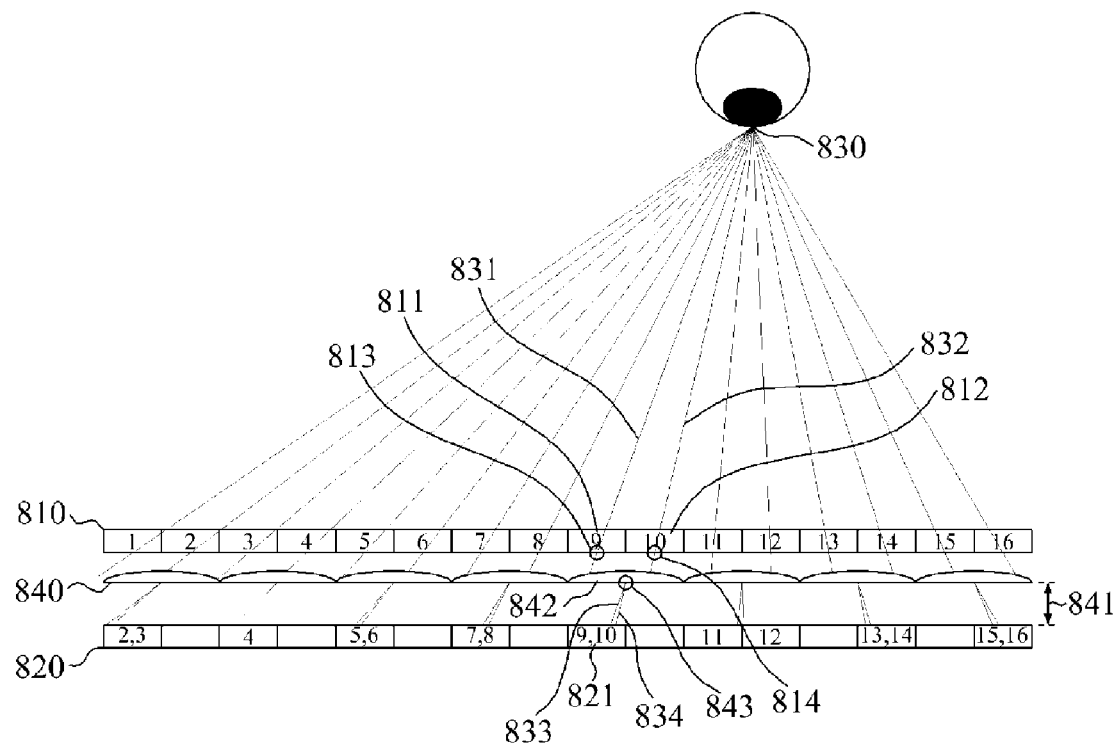
FIGS. 8 and 9 illustrate examples of matching pixels in a layered display including a lens according to example embodiments.
Figure 9:
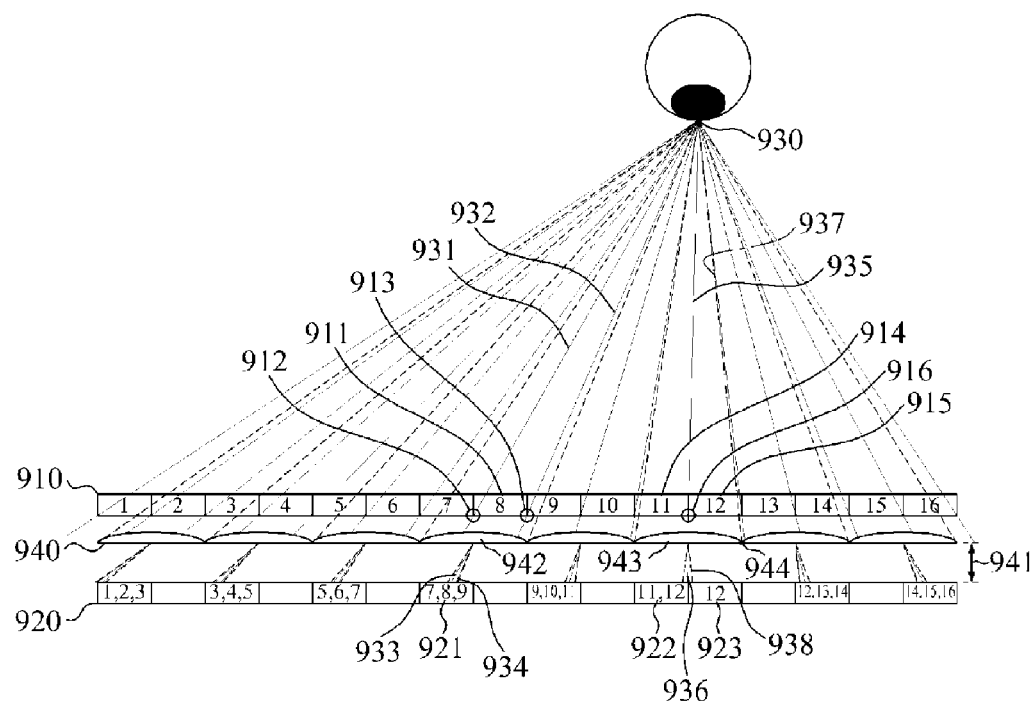

FIGS. 8 and 9 illustrate examples of matching pixels in a layered display including a lens according to example embodiments.

Referring to FIG. 8, an image generating apparatus may use a layered display provided in a structure in which a lens layer 840 is disposed between a plurality of layers 810 and 820. The lens layer 840 may be disposed at a location separated by a focal distance 841 from the layer 820.

The image generating apparatus may generate matching information using a plurality of beams of light toward a location 830 of an eye of a user. Although light emitted by a light emitter may pass through the layer 820, the lens layer 840, and the layer 810 and proceed toward the location 830 of the eye of the user, the image generating apparatus may generate the matching information by inversely tracking a path along which light proceeds from the location 830 of the eye of the user.

The image generating apparatus may determine one of the plurality of layers 810 and 820 to be a reference layer. For example, the image generating apparatus may determine the layer 810 corresponding to an uppermost layer closest to the location 830 of the eye of the user to be the reference layer.

The image generating apparatus may generate the matching information using beams of light passing through centers of a plurality of pixels included in the reference layer. The image generating apparatus may generate the matching information using a path 831 of light passing through a center 813 of a pixel 811 belonging to the layer 810 determined to be the reference layer from the location 830 of the eye of the user. A lens 842 belonging to the lens layer 840 may be positioned on the path 831. As described with reference to FIGS. 7A and 7B, the image generating apparatus may use a path 833 which is parallel to the path 831 and along which light proceeds toward a center 843 of the lens 842. A pixel 821 of the layer 820 may be positioned on the path 833. Thus, the image generating apparatus may set the pixel 811 and the pixel 821 as a single matching pair.

The image generating apparatus may generate the matching information using a path 832 of light passing through a center 814 of a pixel 812 belonging to the layer 810 determined to be the reference layer from the location 830 of the eye of the user. The lens 842 belonging to the lens layer 840 may be positioned on the path 832. The image generating apparatus may use a path 834 which is parallel to the path 832 and along which light proceeds from the center 843 of the lens 842. The pixel 821 of the layer 820 may be positioned on the path 834. Thus, the image generating apparatus may set the pixel 812 and the pixel 821 as a single matching pair.

The image generating apparatus may store the matching information using a data structure corresponding to pixels of the layer 820 corresponding to a lowermost layer closest to the light emitter. The image generating apparatus may store an index of a pixel of the layer 810 matched to a pixel of the layer 820 in a data structure corresponding to the pixel of the layer 820. For example, the pixel 821 of the layer 820 may be matched to the pixel 811 of the layer 810 and the pixel 812 of the layer 810. Thus, the image generating apparatus may store an index "9" of the pixel 811 of the layer 810 and an index "10" of the pixel 812 of the layer 810 in a data structure corresponding to the pixel 821 of the layer 820.

Referring to FIG. 9, the image generating apparatus may use a layered display provided in a structure in which a lens layer 940 is disposed between a plurality of layers 910 and 920. The lens layer 940 may be disposed at a location separated by a focal distance 941 from the layer 920.

The image generating apparatus may determine the layer 910 corresponding to an uppermost layer closest to a location 930 of an eye of a user to be a reference layer. The image generating apparatus may generate matching information using beams of light passing through internal areas between boundaries of a plurality of pixels included in the reference layer.

The image generating apparatus may generate the matching information using a path of light passing through boundaries 912 and 913 of a pixel 911 belonging to the layer 910 determined to be the reference layer from the location 930 of the eye of the user. A lens 942 belonging to the lens layer 940 may be positioned in an area between a path 931 of light passing through the boundary 912 of the pixel 911 and a path 932 of light passing through the boundary 913 of the pixel 911. As described with reference to FIGS. 7A and 7B, the image generating apparatus may use a path 933 which is parallel to the path 831 and along which light proceeds from a center of the lens 942, and a path 934 which is parallel to the path 932 and along which light proceeds from the center of the lens 942. A pixel 921 of the layer 920 may be positioned in an area between the path 933 and the path 934. Thus, the image generating apparatus may set the pixel 911 and the pixel 921 as a single matching pair.

Because the left boundary 912 of the pixel 911 is the same as a right boundary of a left adjacent pixel of the pixel 911, the image generating apparatus may set the left adjacent pixel and the pixel 921 as a single matching pair. Because the right boundary 913 of the pixel 911 is the same as a left boundary of a right adjacent pixel of the pixel 911, the image generating apparatus may set the right adjacent pixel of the pixel 911 and the pixel 921 as a single matching pair.

The image generating apparatus may generate matching information using a path of light passing through a boundary 916 of a pixel 914 belonging to the layer 910 determined to be the reference layer from the location 930 of the eye of the user. A lens 943 belonging to the lens layer 940 may be positioned on the path 935. The image generating apparatus may use a path 936 which is parallel to the path 935 and along which light proceeds from a center of the lens 943. A pixel 922 of the layer 920 may be positioned on the path 936. Thus, the image generating apparatus may set the pixel 914 and the pixel 922 as a single matching pair. Because a right boundary 916 of the pixel 914 is the same as a left boundary of a right adjacent pixel 915 of the pixel 914, the image generating apparatus may set the right adjacent pixel 915 of the pixel 914 and the pixel 922 as a single matching pair.

The image generating apparatus may generate the matching information using a path 937 of light passing through a boundary 944 of the lens 943 belonging to the lens layer 940 from the location 930 of the eye of the user. The image generating apparatus may use a path 938 which is parallel to the path 937 and along which light proceeds from the center of the lens 943. The pixel 915 of the layer 910 may be positioned on the path 937. A pixel 923 of the layer 920 may be positioned on the path 938. Thus, the image generating apparatus may set the pixel 915 and the pixel 923 as a single matching pair.

The image generating apparatus may store the matching information using a data structure corresponding to pixels of the layer 920 corresponding to a lowermost layer closest to the light emitter. The image generating apparatus may store an index of a pixel of the layer 910 matched to a pixel of the layer 920 in a data structure corresponding to the pixel of the layer 920. For example, the pixel 922 of the layer 920 may be matched to the pixel 915 of the layer 910. Thus, the image generating apparatus may store an index "11" of the pixel 914 of the layer 910 and an index "12" of the pixel 915 of the layer 910 in a data structure corresponding to the pixel 922 of the layer 920.

Figure 10A:
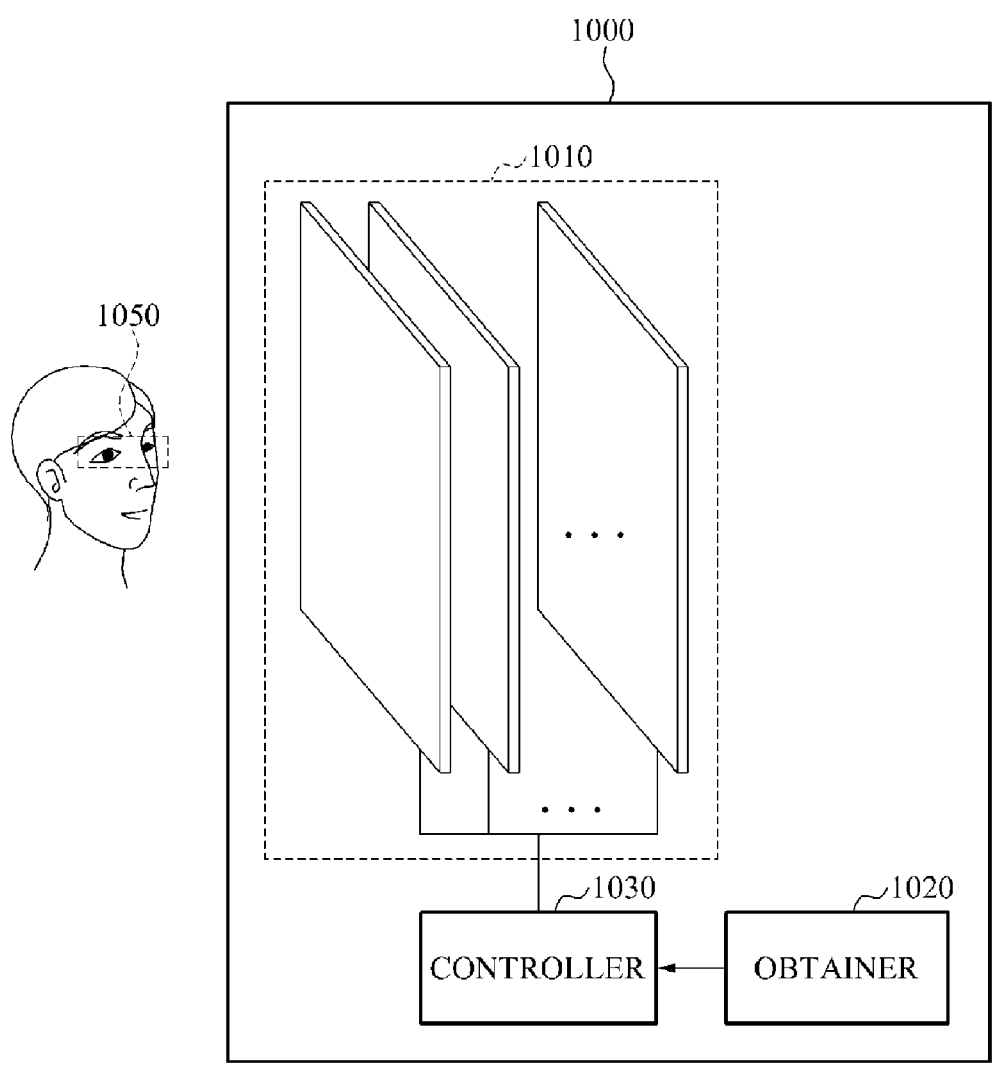
FIGS. 10A and 10B illustrate a display device according to example embodiments.
Figure 10B:
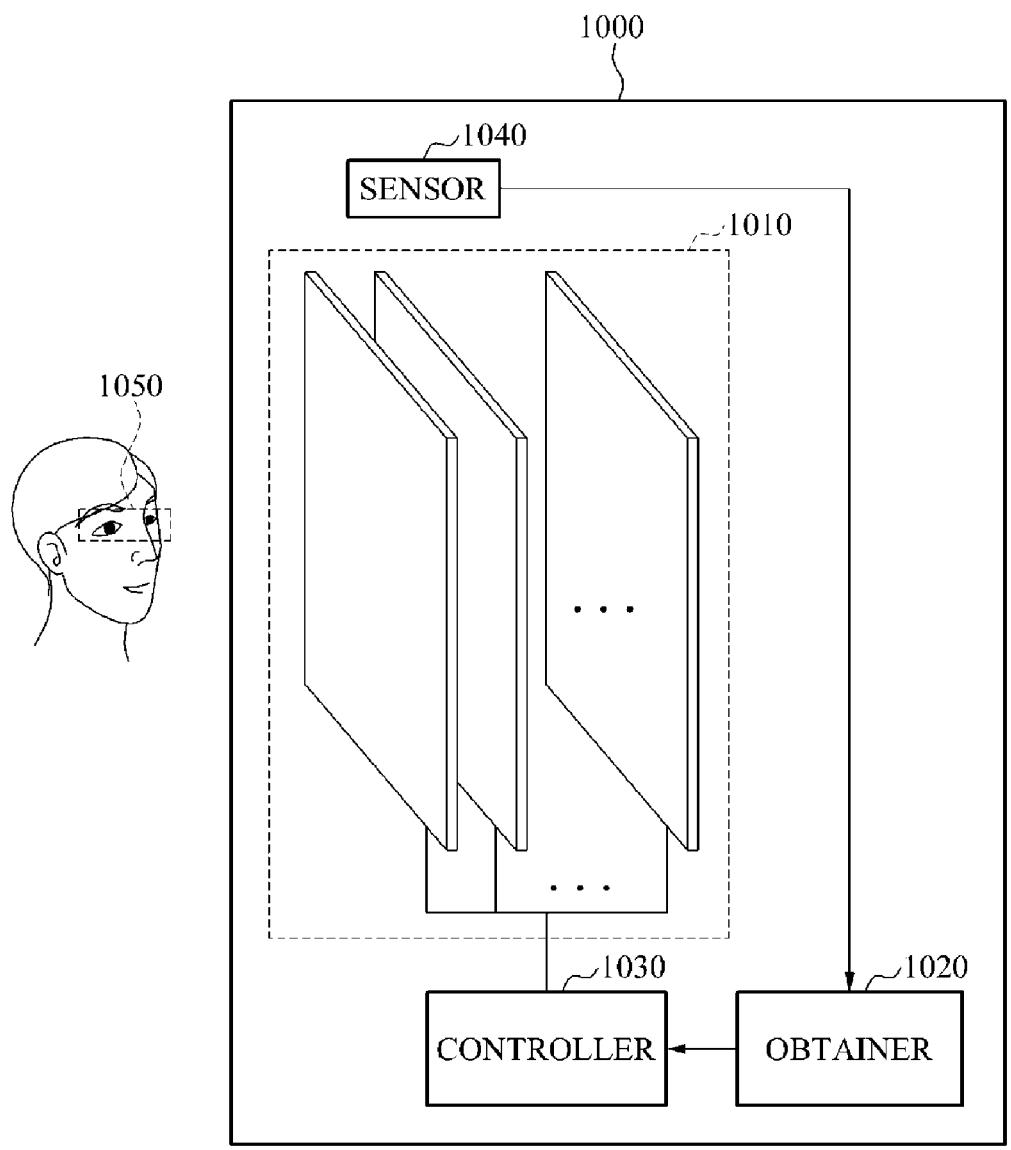

FIGS. 10A and 10B illustrate a display device 1000 according to example embodiments.

Referring to FIG. 10A, the display device 1000 may include a plurality of panels 1010, an obtainer 1020, and a controller 1030. The plurality of panels 1010 may display a 3D image using a structure of a layered display.

The obtainer 1020 may obtain matching information corresponding to a target location. The target location may include a location at which the 3D image is desired to be displayed. For example, the target location may correspond to a location 1050 of an eye of a user. The matching information may include information related to matched pixels included in different panels. The obtainer 1020 may load the matching information corresponding to the target location from a pre-established storage space, based on the target location. The pre-established storage space may comprehensively include a memory included in a display device, or a database remotely positioned and connected to a display device in a wired and wireless manner. In an example, the obtainer 1020 may directly generate matching information based on the target location.

The controller 1030 may control the plurality of panels 1010 based on the matching information for a 3D image to be displayed at the target location. Referring to FIG. 10B, the display device 1000 may further include a sensor 1040. The sensor 1040 may be configured to sense the target location. For example, the sensor 1040 may sense the location 1050 of the eye of the user, and provide information related to the location 1050 of the eye of the user to the obtainer 1020.

The descriptions provided with reference to FIGS. 1 through 9 may be applied to each module shown in FIGS. 10A and 10B and thus, duplicated descriptions will be omitted for conciseness.

Figure 11A:
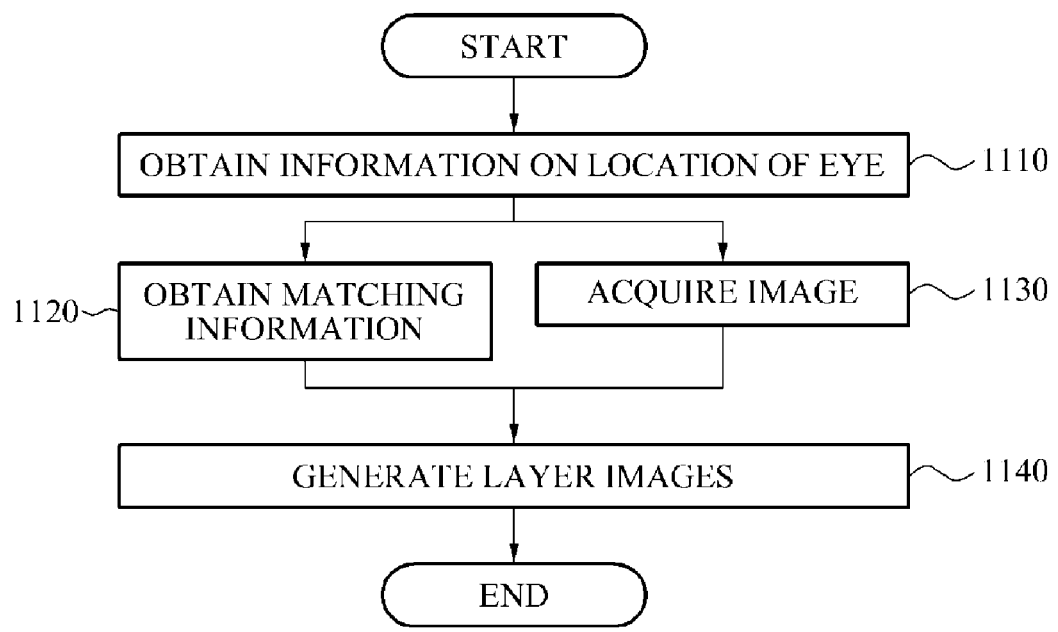
FIGS. 11A and 11B illustrate an image generating method according to example embodiments.
Figure 11B:
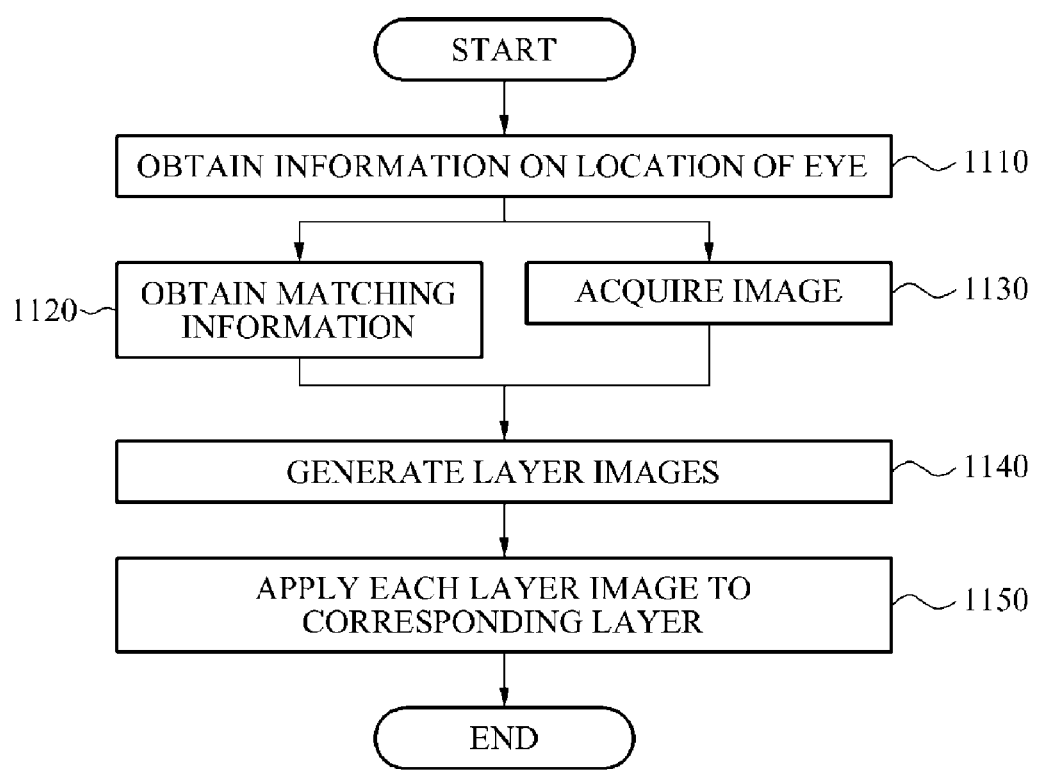

FIGS. 11A and 11B illustrate an image generating method according to example embodiments.

Referring to FIG. 11A, the image generating method may include operation 1110 of obtaining information on a location of an eye of a user, operation 1120 of obtaining matching information between pixels belonging to different layers based on the information on the location of the eye, operation 1130 of acquiring an image desired to be displayed based on the information on the location of the eye, and operation 1140 of generating a plurality of layer images corresponding to a plurality of layers based on the obtained matching information and the acquired image. Referring to FIG. 11B, the image generating method may further include operation 1150 of applying each of the plurality of layer images to a corresponding layer.

The descriptions provided with reference to FIGS. 1 through 10B may be applied to each operation shown in FIGS. 11A and 11B and thus, duplicated descriptions will be omitted for conciseness.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image generating apparatus, comprising:
a processor, configured to:
receive a location of an eye of a user;
match a plurality of pixels included in a plurality of layers based on the location of the eye; and
generate a layer image for each layer of the plurality of layers based on information related to the matched pixels,
wherein a number of the plurality of layers corresponds to "n", a value of a pixel included in the image to be displayed at the location of the eye is calculated using a first equation of $$\left(1 - \frac{I_{actual}}{c}\right) = \left(1 - \frac{x_1}{c}\right)\left(1 - \frac{x_2}{c}\right) \cdots \left(1 - \frac{x_n}{c}\right),$$

wherein the information related to the matched pixels comprises a first matching pixel included in a first layer and a second matching pixel included in a second layer, $I_{actual}$ denotes the value of the pixel included in the image to be displayed at the location of the eye, $x_1$ denotes a value of the first matching pixel, $x_2$ denotes a value of the second matching pixel, $x_n$ denotes a value of the nth matching pixel, and c denotes a panel characteristic of a layer,
wherein a domain of x in the first equation is converted to a domain of $x_c = 1 - x/c$,
wherein the processor is further configured to generate layer images of the plurality of layers using a second equation of $$\underset{X_1, \ldots, X_N}{\arg\min} \|L_{desired} - X_1 \otimes \ldots \otimes X_N\|_W,$$

wherein $L_{desired}$ denotes an image desired to be displayed at the location of the eye of the user, $X_1$ denotes a first layer image in the converted domain of $x_c$, $X_2$ denotes a second layer image in the converted domain of $x_c$, $X_n$ denotes a nth layer image in the converted domain of $x_c$, W denotes the information related to the matched pixels, and $\otimes$ denotes an outer product operation for vector multiplication; and
wherein the generating of the layer image for each layer of the plurality of layers comprises estimating respective degrees of polarization rotations for each of the matching pixels.

2. The apparatus of claim 1, wherein the plurality of layers is configured to display a three-dimensional (3D) image.

3. The apparatus of claim 1, wherein to perform the matching, the processor is further configured to generate matching information by selecting at least one pixel from each of the plurality of layers based on the location of the eye.

4. The apparatus of claim 1,
wherein the information related to the matched pixels comprises first matching information and second matching information, and
wherein, in the matching, the processor is further configured to generate the first matching information based on a location of a left eye of the user, and generate the second matching information based on a location of a right eye of the user.

5. The apparatus of claim 1,
wherein the processor is further configured to receive a first image corresponding to a location of a left eye of the user and a second image corresponding to a location of a right eye of the user, and
wherein, to perform the generating, the processor is further configured to generate the plurality of layer images based on the first image, the second image, and the information related to the matched pixels.

6. The apparatus of claim 5, wherein the processor is further configured to determine the first image and the second image based on the location of the left eye and the location of the right eye.

7. The apparatus of claim 1, wherein, to perform the matching, the processor is further configured to match pixels positioned on a path along which light emitted from a light emitter passes through a center of a pixel included in one of the plurality of layers and reaches the eye of the user.

8. The apparatus of claim 1, wherein, to perform the matching, the processor is further configured to match pixels positioned on a path along which light emitted from a light emitter passes through an internal area between boundaries of a pixel included in one of the plurality of layers and reaches the eye of the user.

9. The apparatus of claim 1, wherein, to perform the generating, the processor is further configured to generate the plurality of layer images by minimizing a difference between an image desired to be displayed at the location of the eye and an image to be displayed at the location of the eye based on the information related to the matched pixels and the plurality of layer images.

10. The apparatus of claim 9,
wherein, to perform the generating, the processor is further configured to convert a multiplication operation to an addition operation through a logarithmic operation, and calculates the product of values of the matching pixels using the addition operation.

11. The apparatus of claim 1, wherein, to perform the generating, the processor is configured to generate the plurality of layer images based on a type of a layered display comprising the plurality of layers.

12. The apparatus of claim 11, wherein the type of the layered display comprises a first type to control a transmittance of a layer, and a second type to control the degree of polarization rotation of a layer.

13. The apparatus of claim 1,
wherein the location of the eye of the user comprises locations of a plurality of eyes with respect to a plurality of users,
wherein, in performing the matching, the processor is further configured to match the plurality of pixels based on the locations of the plurality of eyes, and
wherein, in performing the generating, the processor is further configured to generate layer images to provide a 3D image to each of the plurality of users.

14. The apparatus of claim 1, wherein, in performing the matching, the processor is further configured to generate matching information by selecting a subpixel of an identical type in each of the plurality of layers based on the location of the eye.

15. The apparatus of claim 1, wherein the matched pixels are positioned on a path along which light emitted from a light emitter passes through a lens disposed between two layers of the plurality of layers and reaches the eye or eyes of the user, the lens being disposed between the two layers at a location separated by a focal distance of the lens from a layer of the two layers closer to the light emitter.

16. A display device, comprising:
a plurality of panels configured to display a three-dimensional (3D) image;
a processor configured to:
obtain matching information corresponding to a target location, the matching information comprising information related to matched pixels belonging to different panels of a plurality of panels comprising pixels; and
control, based on the matching information, the plurality of panels for the 3D image to be displayed at the target location,
wherein a number of the plurality of layers corresponds to "n",
a value of a pixel included in an image to be displayed at the target location is calculated using a first equation of $$\left(1 - \frac{I_{actual}}{c}\right) = \left(1 - \frac{x_1}{c}\right)\left(1 - \frac{x_2}{c}\right) \cdots \left(1 - \frac{x_n}{c}\right),$$

wherein the information related to the matched pixels comprises a first matching pixel included in a first layer and a second matching pixel included in a second layer, $I_{actual}$ denotes the value of the pixel included in the image to be displayed at a location of an eye, $x_1$ denotes a value of the first matching pixel, $x_2$ denotes a value of the second matching pixel, $x_n$ denotes a value of the nth matching pixel, and c denotes a panel characteristic of a layer,
wherein a domain of x in the first equation is converted to a domain of $x_c = 1 - x/c$,
wherein the processor is further configured to generate layer images of the plurality of layers using a second equation of $$\operatorname*{argmin}_{X_1,\ldots,X_N} \|L_{desired} - X_1 \otimes \ldots \otimes X_N\|_W,$$

wherein $L_{desired}$ denotes an image desired to be displayed at the location of the eye of the user, $X_1$ denotes a first layer image in the converted domain of $x_c$, $X_2$ denotes a second layer image in the converted domain of $x_c$, $X_n$ denotes a nth layer image in the converted domain of $x_c$, W denotes the matching information, and $\otimes$ denotes an outer product operation for vector multiplication; and
wherein the generating of the layer image for each layer of the plurality of layers comprises estimating respective degrees of polarization rotations for each of the matching pixels.

17. The device of claim 16, wherein the matching information comprises information related to matched pixels positioned on a path along which light emitted from a light emitter reaches the target location.

18. The device of claim 16, further comprising:
a sensor to sense the target location.

19. The device of claim 18, wherein the sensor comprises at least one of:
a first sensor using a plurality of vision sensors; and
a second sensor using a vision sensor and a depth sensor.

20. The device of claim 16, wherein the plurality of panels comprises at least one of:
a first panel to attenuate a luminance of light on a layer corresponding to the first panel; and
a second panel to rotate a polarization direction of light on a layer corresponding to the second panel.

21. The device of claim 16, wherein the matched pixels are positioned on a path along which light emitted from a light emitter passes through a lens disposed between two panels of the plurality of panels and reaches the eye or eyes of a user, the lens being disposed between the two panels at a location separated by a focal distance of the lens from a panel of the two panels closer to the light emitter.

22. The device of claim 21, wherein the processor is further configured to determine a plurality of layer images corresponding to the plurality of panels by minimizing a difference between an image desired to be displayed at the target location and an image to be displayed at the target location based on the matching information and the plurality of panels.

23. The device of claim 21, wherein the lens restricts a direction of light from the panel of the two panels closer to the light emitter to a predetermined area.

24. An image generating method, comprising:
obtaining information on a location of an eye of a user;
obtaining matching information between pixels belonging to different layers based on the information on the location of the eye;
acquiring an image desired to be displayed based on the information on the location of the eye; and
generating a plurality of layer images corresponding to a plurality of layers based on the matching information and the acquired image,
wherein the generating of the plurality of layer images comprises:
determining a first pixel in a first layer, a second pixel in a second layer, and a third pixel in the image desired to be displayed based on the matching information;
estimating a degree of polarization rotation for the third pixel based on an experimentally obtained model with respect to a first degree of polarization rotation for the first pixel, a second degree of polarization rotation for the second pixel, and characteristics of the first and second layers; and determining the first degree of polarization rotation and the second degree of polarization rotation based on the estimated degree of polarization rotation for the third pixel and a predetermined degree of polarization rotation for the third pixel, wherein a number of the plurality of layers corresponds to "n", the experimentally obtained model is $$\left(1 - \frac{I_{actual}}{c}\right) = \left(1 - \frac{x_1}{c}\right)\left(1 - \frac{x_2}{c}\right) \ldots \left(1 - \frac{x_n}{c}\right),$$

and wherein the information related to the matched pixels comprises a first matching pixel included in the first layer and a second matching pixel included in the second layer, $I_{actual}$ denotes the value of the pixel included in the image to be displayed at the location of the eye, $x_1$ denotes a value of the first matching pixel, $x_2$ denotes a value of the second matching pixel, $x_n$ denotes a value of the nth matching pixel, and c denotes a panel characteristic of a layer.

25. The method of claim 24, further comprising:
applying each of the plurality of layer images to a corresponding layer.

26. A non-transitory computer-readable medium comprising a program for instructing a computer to perform the method of claim 24.

27. A three-dimensional image display method, comprising:
tracking a location of an eye of a viewer;
determining a first pixel in a first layer, a second pixel in a second layer, and a third pixel in an image to be displayed, based on the tracked location;
reproducing a first image on a first layer of a display apparatus; and
reproducing a second image on a second layer of the display apparatus based on a path of light from the first image through the second layer to the location of the eye of the viewer,
wherein the reproducing of the second image comprises:
estimating a degree of polarization rotation for the third pixel based on an experimentally obtained model with respect to a first degree of polarization rotation for the first pixel, a second degree of polarization rotation, and characteristics of the first and second layers; and
determining the second degree of polarization rotation based on the first degree of polarization rotation, the estimated degree of polarization rotation for the third pixel, and a predetermined degree of polarization rotation for the third pixel, wherein a number of the plurality of layers corresponds to "n", wherein the experimentally obtained model is $$\left(1 - \frac{I_{actual}}{c}\right) = \left(1 - \frac{x_1}{c}\right)\left(1 - \frac{x_2}{c}\right) \ldots \left(1 - \frac{x_n}{c}\right),$$

and wherein the information related to the matched pixels comprises a first matching pixel included in the first layer and a second matching pixel included in the second layer, $I_{actual}$ denotes the value of the pixel included in the image to be displayed at the location of the eye, $x_1$ denotes a value of the first matching pixel, $x_2$ denotes a value of the second matching pixel, $x_n$ denotes a value of the nth matching pixel, and c denotes a panel characteristic of a layer.

28. The method of claim 27, wherein the images are reproduced by using at least one of the first layer and the second layer to control at least one of a transmittance and a degree of polarization rotation of the light.

* * * * *